(12) United States Patent
Kanbayashi et al.

(10) Patent No.: US 8,411,378 B2
(45) Date of Patent: Apr. 2, 2013

(54) ZOOM LENS AND IMAGE PICKUP APPARATUS EQUIPPED WITH SAME

(75) Inventors: Nobumasa Kanbayashi, Suwa (JP); Masato Miyata, Machida (JP)

(73) Assignee: Olympus Imaging Corp., Tokyo (JP)

( * ) Notice: Subject to any disclaimer, the term of this patent is extended or adjusted under 35 U.S.C. 154(b) by 300 days.

(21) Appl. No.: 12/807,935

(22) Filed: Sep. 17, 2010

(65) Prior Publication Data

US 2011/0080649 A1    Apr. 7, 2011

(30) Foreign Application Priority Data

Oct. 7, 2009  (JP) .................................. 2009-233330

(51) Int. Cl.
  *G02B 9/34*  (2006.01)
(52) U.S. Cl. ...................................................... 359/781
(58) Field of Classification Search .................. 359/686, 359/689, 781, 787
See application file for complete search history.

(56) References Cited

U.S. PATENT DOCUMENTS 3,143,590 A  * 8/1964 Higuchi ......................... 359/682
5,009,491 A   4/1991 Hata

FOREIGN PATENT DOCUMENTS

| JP | 64-040913 | 2/1989 |
| JP | 2001-208969 | 8/2001 |
| JP | 2004-318099 | 11/2004 |

* cited by examiner

*Primary Examiner* — Joseph P Martinez
(74) *Attorney, Agent, or Firm* — Kenyon & Kenyon LLP

(57) ABSTRACT

A zoom lens includes a negative first lens unit G1 and a positive second lens unit G2. The second lens unit G2 includes first and second cemented lens components that are arranged adjacent to each other. The first and second cemented lens components are each made up of a plurality of lens elements having different refractive indices and different Abbe constants. The image side surface of the first cemented lens component and the object side surface of the second cemented lens component are both concave surfaces.

23 Claims, 15 Drawing Sheets

FIG. 4
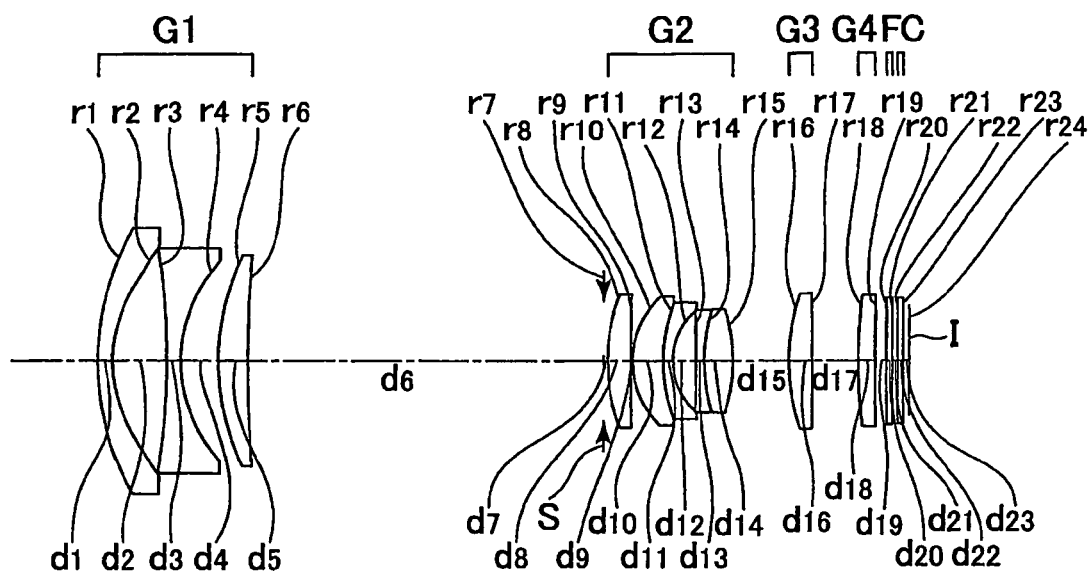
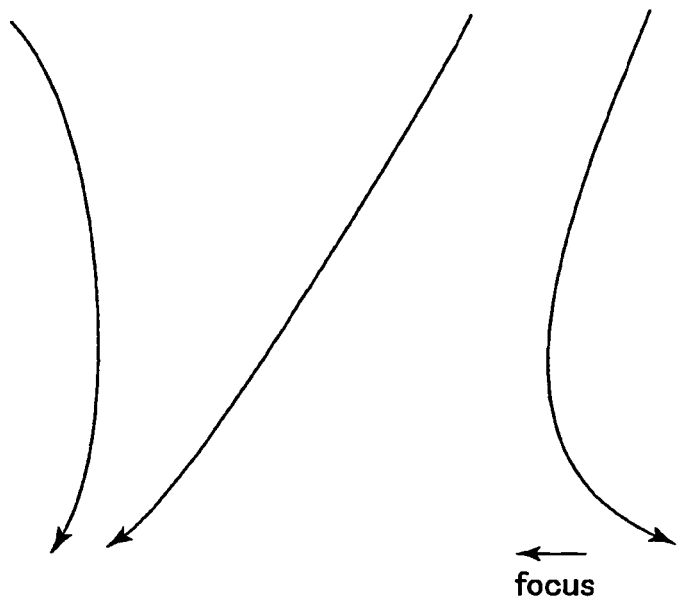
focus

FIG. 5
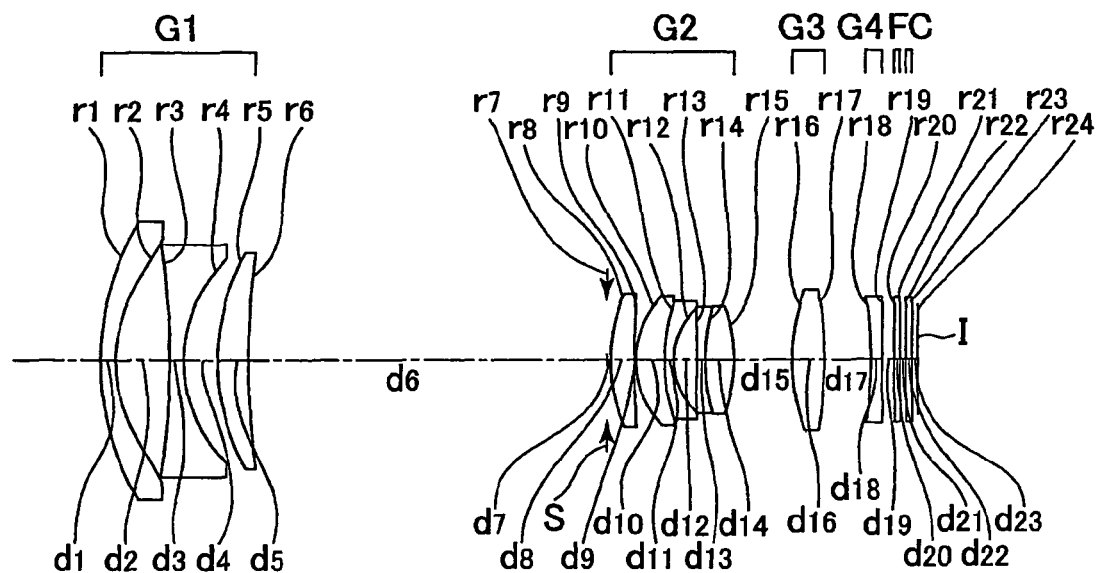
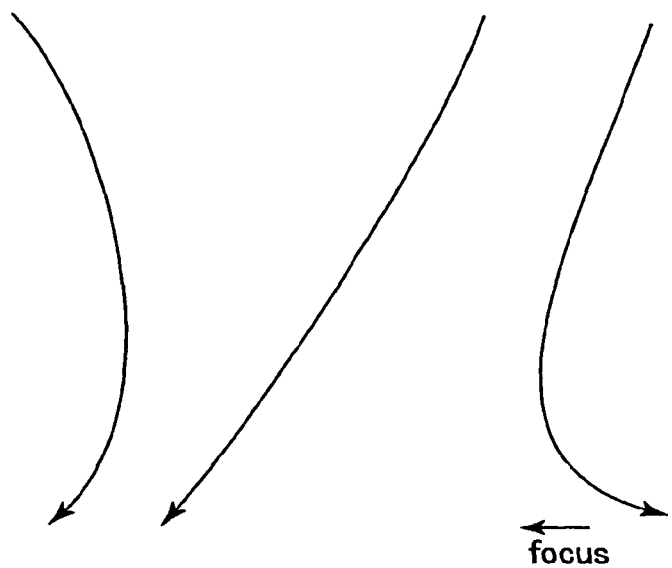

FIG. 6
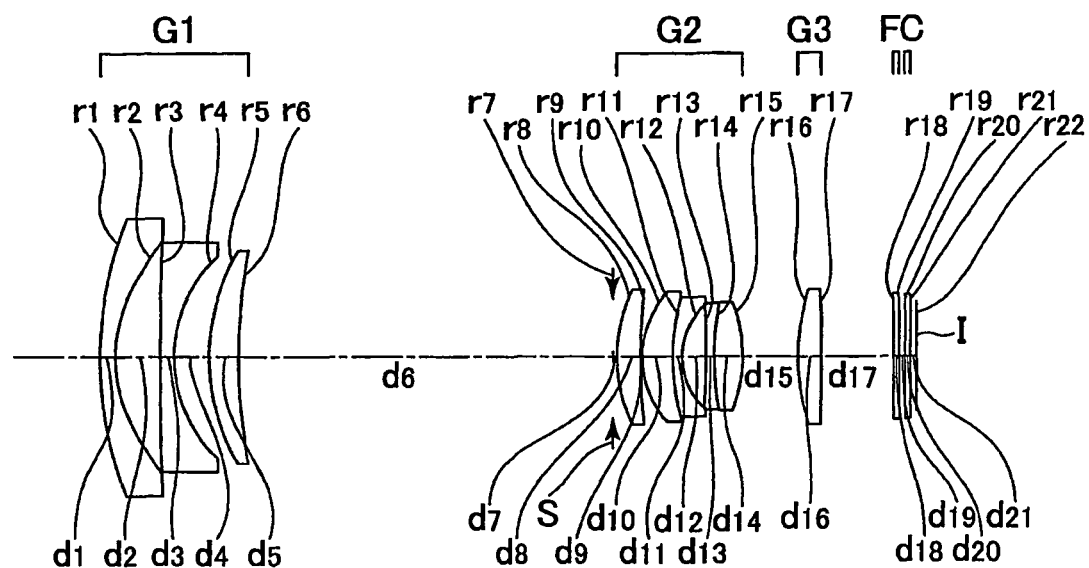
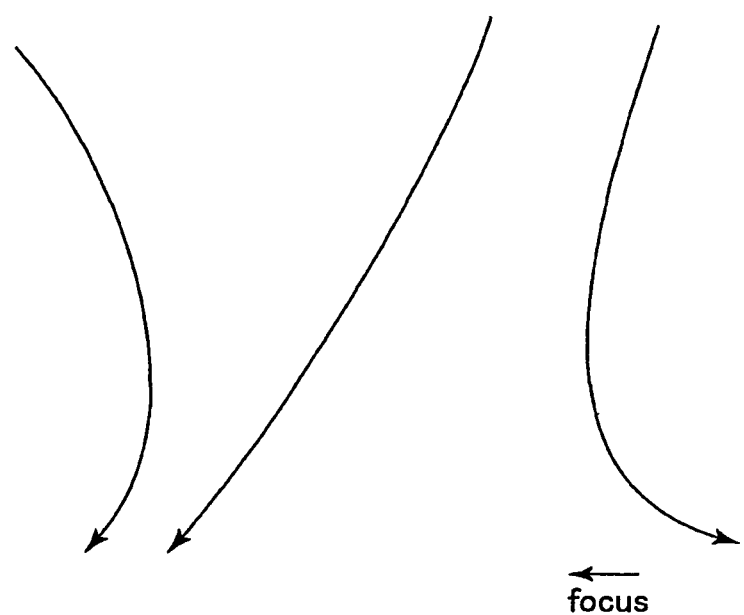
focus

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2009-233330 filed on Oct. 7, 2009; the entire contents of which are incorporated herein by reference.

BACKGROUND OF THE INVENTION

1. Field of the Invention

The present invention relates to a zoom lens and an image pickup apparatus equipped with the same, such as a video camera and a digital camera.

2. Description of the Related Art

Electronic image pickup apparatuses such as digital cameras and video cameras have become the mainstream in recent years. The electronic image pickup apparatus picks up an image of an object using an image pickup element such as a CCD sensor or a CMOS sensor instead of a film.

Various types of electronic image pickup apparatuses including, for example, high-performance professional-use digital cameras, compact popular-priced digital cameras, and surveillance cameras are widely used.

Since there are various shooting situations, zoom lenses that provide changes in the angle of view find favor commonly for use in such electronic image pickup apparatuses.

Furthermore, there is a need for slimming and size reduction of electronic image pickup apparatuses and for improvement in the image quality.

However, reducing the pixel pitch of the image pickup element will lead to a low sensitivity due to a decrease in the signal-to-noise ratio, which tends to invite a deterioration in the image quality caused by motion blur and/or hand shake.

Motion blur cannot be eliminated or reduced by hand shake reduction methods using a mechanical correction mechanism that shifts a part of the optical system or the image pickup element, because the exposure time cannot be shortened. A reduction or elimination of motion blur requires a complicated control system.

One possible solution is to detect a motion of an object by a sensor or the like and shifts the optical system and/or the image pickup element relative to the body of the image pickup apparatus. Another possible solution is performing correction of an image by electrical computation after shooting an object.

A known solution is to increase the sensitivity of the image pickup element to shorten the exposure time. This solution is effective in reducing both motion blur and hand shake. However, shortening of the exposure time leads to a decrease in the quantity of light received by each light receiving element arranged on the image pickup surface of the image pickup element. Consequently, the signal-to-noise ratio becomes lower, and the image quality tends to be deteriorated by noises.

To compensate insufficient sensitivity, a zoom lens having a fast (i.e. small) F-number is required.

Zoom lenses used in compact digital cameras typically have a zoom ratio of approximately 3 (three) and a wide angle of view at the wide angle end of approximately 63°.

To enable satisfactory shooting in various situations, zoom lenses having a high zoom ratio and a wide angle of view at the wide angle end are demanded.

It is known that to achieve a fast F-number, a type of zoom lenses in which the first lens unit (i.e. the frontmost lens unit) has a positive refracting power are advantageous. However, in this type of zoom lenses, the diameter of the first lens unit tends to be large, and the total number of lenses tends to be large. For this reason, this type of zoom lens is not suitable as a zoom lens that is collapsible into a thin (or slim) form for housing in the image pickup apparatus when the apparatus is not in use.

On the other hand, a type of zoom lenses in which the first lens unit has a negative refracting power (which are sometimes called negative-lead type zoom lenses) are known as zoom lenses that allow housing in a compact form. This type of zoom lenses are used many in slim cameras, because they can be made thinner, when collapsed, than the zoom lenses in which the first lens unit has a positive refracting power.

As such zoom lenses, zoom lenses in which the lens unit closest to the object side has a negative refracting power, and the distances between lens units change during zooming from the wide angle end to the telephoto end are disclosed in Japanese Patent Application Laid-Open Nos. 2004-318099, Hei 1-40913, and 2001-208969.

SUMMARY OF THE INVENTION

A zoom lens according to the present invention comprises:

a first lens unit having a negative refracting power disposed closest to the object side; and a second lens unit having a positive refracting power disposed on the image side of the first lens unit, wherein during zooming from the wide angle end to the telephoto end, a distance between the first lens unit and the second lens unit decreases, when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component, the first cemented lens component and the second cemented lens component are arranged adjacent to each other, and the image side surface of the first cemented lens component and the object side surface of the second cemented lens component are both concave surfaces.

A zoom lens according to another aspect of the present invention comprises:

a first lens unit having a negative refracting power disposed closest to the object side; and a second lens unit having a positive refracting power disposed on the image side of the first lens unit, wherein during zooming from the wide angle end to the telephoto end, a distance between the first lens unit and the second lens unit decreases, when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component, the second lens unit further comprises a positive lens component in addition to the first cemented lens component and the second cemented lens component, and all the lens elements included in the first lens component are meniscus lenses that are convex toward the object side.

A zoom lens according to another aspect of the present invention comprises:

a first lens unit having a negative refracting power disposed closest to the object side; and a second lens unit having a positive refracting power disposed on the image side of the first lens unit, wherein during zooming from the wide angle end to the telephoto end, a distance between the first lens unit and the second lens unit decreases, when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component, the zoom lens further comprises a third lens unit having a positive refracting power disposed on the image side of the second lens unit, and a fourth lens unit disposed on the image side of the third lens unit and having a lens surface that has different curvatures in a central portion and in a peripheral portion, and a distance between the second lens unit and the third lens unit and a distance between the third lens unit and the fourth lens unit change during zooming.

An image pickup apparatus according to the present invention comprises:

the above-described zoom lens; and an image pickup element that is disposed on the image side of the zoom lens, has an image pickup surface for picking up an image formed by the zoom lens, and converts the image into an electrical signal.

BRIEF DESCRIPTION OF THE DRAWINGS

FIG. 4 shows a zoom lens according to a fourth embodiment of the present invention in the same manner as FIG. 1.

FIG. 5 shows a zoom lens according to a fifth embodiment of the present invention in the same manner as FIG. 1.

FIG. 6 shows a zoom lens according to a sixth embodiment of the present invention in the same manner as FIG. 1.

DETAILED DESCRIPTION OF THE INVENTION

Figure 1:
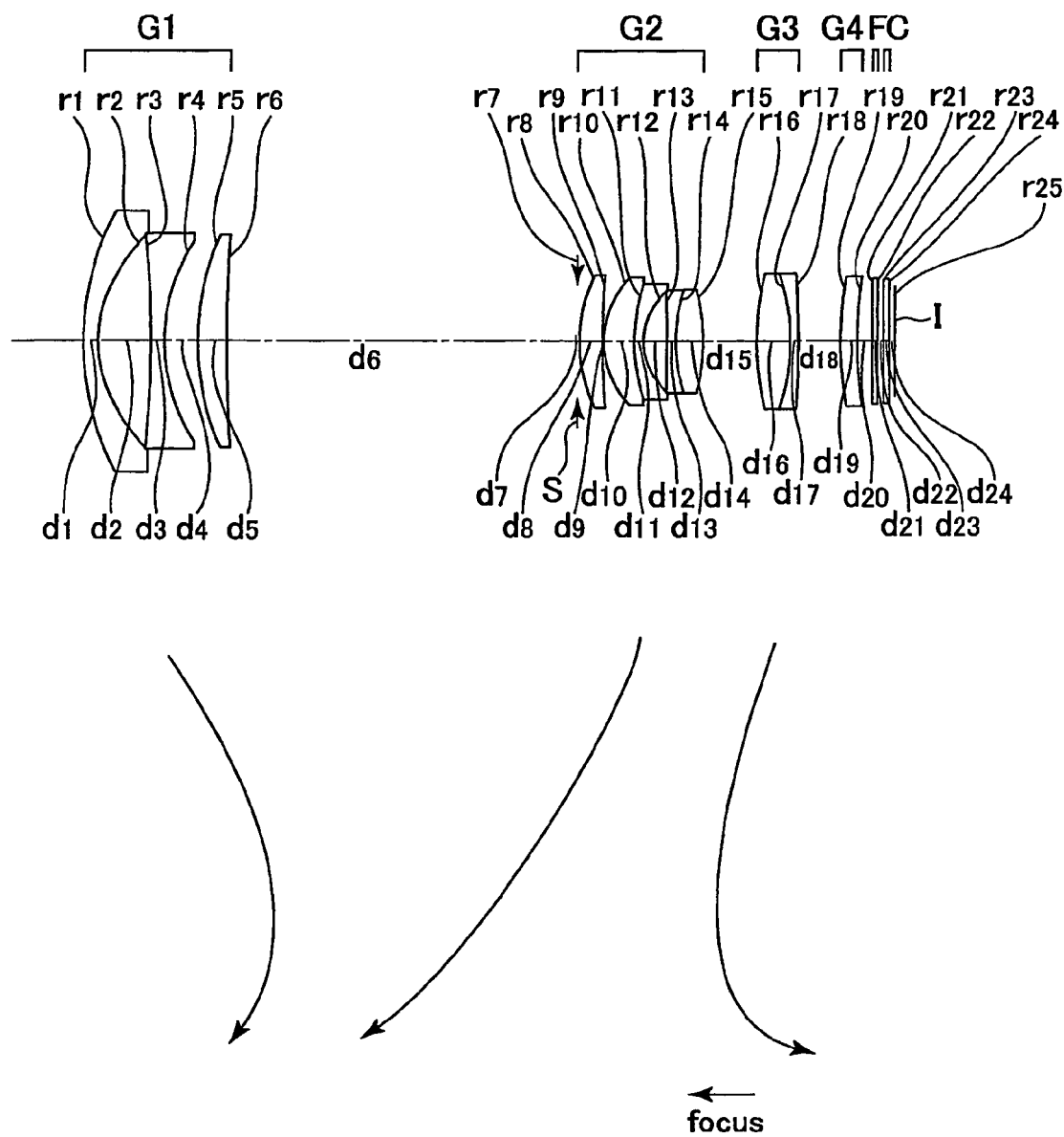
FIG. 1 shows a cross sectional view of a zoom lens according to a first embodiment of the present invention at the wide angle end in the state in which the zoom lens is focused on an object point at infinity, and also shows how lens units move during zooming from the wide angle end to the telephoto end.

The zoom lens according to the present invention includes a first lens unit having a negative refracting power disposed closest to the object side, and a second lens unit having a positive refracting power disposed on the image side of the first lens unit, wherein the distance between the first lens unit and the second lens unit decreases during zooming from the wide angle end to the telephoto end, and the second lens unit includes a first cemented lens component made up of a plurality of lens elements having different refractive indices and different Abbe constants and a second cemented lens component disposed on the image side of the first cemented lens component and made up of a plurality of lens elements having different refractive indices and different Abbe constants, where the lens component is defined as a lens member whose refractive surfaces that are in contact with air in the optical path include only two surfaces or an object side surface and an image side surface.

As described above, the lens unit disposed closest to the object side is designed to have a negative refracting power. This ensures an adequate angle of view at the wide angle end and facilitates a reduction in the diameter of the zoom lens.

The diameter of on-axis beams tends to be large in the second lens unit having a positive refracting power disposed on the image side of the first lens unit. In addition, the second lens unit is required to have a sufficiently high positive refracting power in order to achieve a size reduction and an adequate zoom ratio. Especially in the case of large diameter zoom lenses, spherical aberration and axial chromatic aberration tend to be conspicuous. In view of the above, in the lens configuration according to the present invention, the second lens unit comprises the first cemented lens component made up of a plurality of lens elements having different refractive indices and different Abbe constants and the second cemented lens component disposed on the image side of the first lens component and made up of a plurality of lens elements having different refractive indices and different Abbe constants.

The use of the plurality of cemented lens components enables a reduction of chromatic aberration and facilitates correction of aberrations by refracting effects of the respective lens surfaces.

In the above-described zoom lens, it is more preferred that one or more of the following features be adopted.

It is preferred that that the first cemented lens component and the second cemented lens component be arranged adjacent to each other, and the image side surface of the first cemented lens component and the object side surface of the second cemented lens component both be concave surfaces.

These concave surfaces of the first and second cemented lens components advantageously contribute to correction of spherical aberration and correction of the Petzval sum.

It is preferred that the second lens unit further include a positive lens component having a positive refracting power in addition to the first cemented lens component and the second cemented lens component.

If a positive lens component having a positive refracting power is provided in addition to the first and second cemented lens components, the second lens unit can have an adequate positive refracting power, and correction of aberrations, in particular, correction of spherical aberration is facilitated.

This positive lens component may be disposed on the object side of the first cemented lens component. This provides an advantage in reducing the size of the second lens unit.

It is preferred that all the lens elements in the first cemented lens component be meniscus lenses that are convex toward the object side.

This allows a reduction of the thickness of the cemented lens component on the optical axis while ensuring adequate correction of chromatic aberration by the cemented lens component. This is advantageous in achieving size reduction.

If the positive lens component is disposed on the object side of the first cemented lens component, the incidence heights of rim rays of an axial bundle on each cemented surface in the first cemented lens component can be made lower. This is favorable from the viewpoint of aberration correction.

It is preferred that a third lens unit having a positive refracting power be further provided on the image side of the second lens unit, and that the distance between the second lens unit and the third lens unit change during zooming.

If the third lens unit having a positive refracting power is provided, the exit pupil can easily be made remoter from the image plane. This is advantageous in reducing shading, which is peculiar to an electronic image pickup element. In addition, the third lens unit may be a lens unit that is moved for focusing. If this is the case, it is possible to make the focusing mechanism simpler as compared to cases in which another lens unit is moved for focusing, while suppressing variations in the magnification during focusing.

Furthermore, it is preferred that a fourth lens unit having a lens surface that has different curvatures in a central portion and in a peripheral portion be provided on the image side of the third lens unit, and that the distance between the third lens unit and the fourth lens unit change during zooming.

The use of the fourth lens unit having an aspheric surface is advantageous in correcting astigmatism and other aberrations and facilitates an increase in the angle of view and an increase in the aperture ratio of the zoom lens.

It is preferred that the first cemented lens component be composed of a positive lens element and a negative lens element arranged in order from the object side to the image side, the second cemented lens component be composed of a negative lens element and a positive lens element arranged in order from the object side to the image side, and the image side surface of the first cemented lens component and the object side surface of the second cemented lens component both be concave surfaces.

This is advantageous in ensuring adequate aberration correction by the first and second lens components and in achieving size reduction.

It is preferred that the first cemented lens component and the second cemented lens component be arranged adjacent to each other, the image side surface of the first cemented lens component be a concave surface, and the following conditional expression be satisfied:

$$-1.02 < SF2n < -0.1 \quad (1)$$

where SF2n is defined by the equation "SN2f=(R1r+R2f)(R1r−R2f)", where R1r is the paraxial radius of curvature of the image side surface of the first cemented lens component, and R2f is the paraxial radius of curvature of the object side surface of the second cemented lens component.

Designing the image side surface of the first cemented lens component and the object side surface of the second cemented lens component in such a way as to have shapes that satisfy conditional expression (1) is advantageous in achieving well-balanced correction of aberration generated in the second lens unit by the two cemented lens components.

It is preferred that the first cemented lens component have a meniscus shape having a convex surface facing the object side and a concave surface facing the image side, and the second cemented lens component have a meniscus shape having a concave surface facing the object side and a convex surface facing the image side.

If this is the case, a symmetric arrangement of the shapes of the object side surfaces and the image side surfaces of the two cemented lens components is achieved. This facilitates correction of aberrations such as spherical aberration and astigmatism.

It is preferred that the first cemented lens component be composed of a positive lens element and a negative lens element arranged in order from the object side to the image side, the second cemented lens component be composed of a negative lens element and a positive lens element arranged in order from the object side to the image side, and the following conditional expression (2) be satisfied:

$$40 < vd2 < 100 \quad (2),$$

where vd2 is defined by the equation "vd2=(vdCL1p+vdCL2p)−(vdCL1n+vdCL2n)", where vdCL1p is the Abbe constant of the positive lens element in the first cemented lens component for the d-line, vdCL2p is the Abbe constant of the positive lens element in the second cemented lens component for the d-line, vdCL1n is the Abbe constant of the negative lens element in the first cemented lens component for the d-line, and vdCL2n is the Abbe constant of the negative lens element in the second cemented lens component for the d-line.

The conditional expression (2) provides a condition that is preferred for correction of chromatic aberration, in particular axial chromatic aberration. To correct chromatic aberration that is generated due to a high positive refracting power of the second lens unit in the second lens unit, it is preferred that the positive lens be made of a material having a relatively low chromatic dispersion within an appropriate range, and the negative lens be made of a material having a relatively high chromatic aberration within an appropriate range. Specifically, it is preferred that the difference between the Abbe constants of the positive lens and the negative lens satisfy the conditional expression (2). Not exceeding the lower limit of conditional expression (2) is further advantageous in correcting chromatic aberration and advantageous in achieving satisfactory optical performance and in reducing color blur.

Not exceeding the upper limit of conditional expression (2) is advantageous in terms of the ease of machining and cost of the lens material used.

It is preferred that the first cemented lens component and the second cemented lens component in the second lens unit be arranged adjacent to each other, and the following conditional expression (3) be satisfied:

$$0.08 < D2/f2 < 0.20 \quad (3),$$

where D2 is the distance between the first cemented lens component and the second cemented lens component in the second lens unit on the optical axis, and f2 is the focal length of the second lens unit.

Conditional expression (3) specifies preferred values for the air gap between the image side surface of the first cemented lens component and the object side surface of the second cemented lens component.

Not exceeding the lower limit of conditional expression (3) to provide an adequate gap between the two cemented lens components is advantageous in correcting aberrations.

If the upper limit of conditional expression (3) is not exceeded, the thickness of the second lens unit on the optical axis can be made small. This facilitates size reduction.

It is preferred that the second cemented lens component be disposed closest to the image side in the second lens unit, and the lens element located closest to the image side in the second cemented lens component be a positive lens element, and the image side surface of this positive lens element be an aspheric surface that is convex toward the image side.

If the emergent surface that is closest to the image side in the second lens unit is an aspheric surface, correction of coma that occurs in the off-axis region is facilitated, and good imaging performance can easily be achieved. In addition, the convex shape of the aspheric surface can make the imaging performance less affected by the manufacturing errors.

It is preferred that the second lens unit include a single lens component having a positive refracting power disposed on the object side of the first cemented lens component, and this single lens component has an aspheric lens surface.

If this is the case, the curvatures of the lens surfaces or the refracting powers of the lenses in the second lens unit can be made low, and aberrations can be made small accordingly. In addition, if the single lens having a positive refracting power has at least one aspheric surface, spherical aberration generated in the second lens unit can be corrected more effectively.

Furthermore, it is preferred that the second lens unit be composed of three lens components.

If this is the case, it is possible to achieve good optical performance while making the size of the second lens unit with respect to the optical axis direction small.

It is preferred that the following conditional expressions (4) and (5) be satisfied:

$$0.26 < 1GUY/fw < 0.35 \quad (4), \text{ and}$$

$$0.2 < 2GUY/f2 < 0.5 \quad (5),$$

where 1GUY is the height, from the optical axis, of axial marginal rays incident on the refractive surface located closest to the object side in the first lens unit at the wide angle end, 2GUY is the height, from the optical axis, of axial marginal rays incident on the refractive surface located closest to the object side in the second lens unit at the wide angle end, fw is the focal length of the entire zoom lens system at the wide angle end, and f2 is the focal length of the second lens unit.

Alternatively, it is preferred that the following conditional expressions (4) and (6) be satisfied:

$$0.26 < 1GUY/fw < 0.35 \quad (4), \text{ and}$$

$$0.60 < 2GUY/fw < 1.00 \quad (6).$$

Conditional expression (4) specifies preferred values of the F-number at the wide angle end.

Not exceeding the lower limit of conditional expression (4) is advantageous in ensuring an adequate entrance pupil size, in reducing noises, and in reducing motion blur by high shutter speeds.

Not exceeding the upper limit of conditional expression (4) reduces the need for increasing the number of lenses for aberration correction.

Conditional expression (5) or (6) states a condition for achieving good balance between reduction of aberrations generated in the second lens unit and brightness (or lens speed).

It is preferred that the lower limit of conditional expression (5) or (6) be not exceeded thereby achieving an adequate diameter of axial bundle incident on the second lens unit. This facilitates achieving a brightness (lens speed) that satisfies conditional expression (4).

It is preferred that the upper limit of conditional expression (5) or (6) be not exceeded thereby limiting the diameter of axial bundle in the second lens unit appropriately. This facilitates suppression of aberrations.

It is preferred that the zoom lens have an aperture stop that adjusts the F-number, and the first lens unit satisfy the following conditional expression (7):

$$1.4 < |f1|/(fw \cdot Fnow) < 2.0 \quad (7),$$

where f1 is the focal length of the first lens unit, fw is the focal length of the entire zoom lens system at the wide angle end, and Fnow is the F-number at full aperture at the wide angle end.

From the viewpoint of the balance between size reduction and optical performance, it is preferred that the refracting power (the inverse of the focal length) of the first lens unit satisfy conditional expression (7).

Not exceeding the lower limit of conditional expression (7) to make the refracting power of the first lens unit low is advantageous in reducing aberrations at the wide angle end thereby achieving good optical performance.

Not exceeding the upper limit of conditional expression (7) to make the refracting power of the first lens unit adequately high facilitates a reduction in the length of the entire zoom lens system. This is advantageous for size reduction of the lens barrel It is preferred that the second lens unit satisfy the following conditional expression (8):

$$2.5 < f2/fw < 3.5 \quad (8),$$

where f2 is the focal length of the second lens unit, and fw is the focal length of the entire zoom lens system at the wide angle end.

It is preferred that the refracting power of the second lens unit be so low that the lower limit of conditional expression (8) is not exceeded. This facilitates correction of aberrations. Not exceeding the upper limit of conditional expression (8) facilitates providing the second lens unit with an adequate magnification changing effect. This is advantageous in reducing the entire length at the telephoto end.

It is preferred that a third lens unit that satisfies the following conditional expression (9) be provided on the image side of the second lens unit:

$$3.5 < f3/fw < 6.5 \quad (9),$$

where f3 is the focal length of the third lens unit, and fw is the focal length of the entire zoom lens system at the wide angle end.

Not exceeding the lower limit or upper limit of conditional expression (9) is advantageous for correction of astigmatism.

If this is the case, the third lens unit may be made of a plastic material. The third lens unit may be moved during zooming to control the position of the exit pupil so that rays are incident on the image pickup element effectively. To this end, if the refracting power of the third lens unit is designed to satisfy conditional expression (9), the third lens unit does not need to have a relatively large refracting power, and it may be made of a material having a low refractive index such as a plastic. Using a plastic lens in the third lens unit is advantageous also for cost reduction.

In addition, the plastic lens is advantageous also for correction of off-axis aberrations, because it allows easy machining for forming an aspheric surface.

It is preferred that the following conditional expression (10) be satisfied:

$$10 < Lw/fw < 12 \qquad (10),$$

where Lw is the entire length of the zoom lens at the wide angle end with the back focus being represented by the equivalent air distance, fw is the focal length of the entire zoom lens system at the wide angle end.

Not exceeding the lower limit of conditional expression (10) facilitates providing a space that allows movement of the second lens unit for zooming.

Not exceeding the upper limit of conditional expression (10) to make the entire length of the zoom lens at the wide angle end small is advantageous for size reduction of the lens barrel with respect to the thickness direction (i.e. the direction along the optical axis). In addition, since this allows a reduction in the effective diameter of the first lens unit, this is advantageous for size reduction of the zoom lens with respect to the diametrical direction.

It is also preferred that the following conditional expression (11) concerning the amount of movement of the second lens unit during zooming from the wide angle end to the telephoto end be satisfied:

$$3.5 < M2G/fw < 5.0 \qquad (11),$$

where M2G is the amount of movement of the second lens unit during zooming from the wide angle end to the telephoto end, and fw is the focal length of the entire zoom lens system at the wide angle end.

Not exceeding the lower limit of conditional expression (11) is advantageous in achieving an adequate magnification changing effect while making aberrations generated in the second lens unit small.

Not exceeding the upper limit of conditional expression (11) allows a reduction in the entire length of the zoom lens at the telephoto end, leading to size reduction of the lens barrel that holds the zoom lens.

It is also preferred that the zoom lens have an aperture stop disposed at a certain position in the range from the air gap immediately in front of the object side end of the second lens unit to the image side surface of the second lens unit, and that the aperture stop move integrally with the second lens unit during zooming from the wide angle end to the telephoto end.

Disposing the aperture stop in the vicinity of the second lens unit allows size reduction of the second lens unit with respect to the diametrical direction while providing the second lens unit with an adequate refracting power. In addition, this is advantageous for reduction of variations of aberrations during zooming, because changes in the height of rays in the second lens unit during zooming can be made small.

It is preferred that the first lens unit include an aspheric lens.

Since the difference between the height of off-axis rays at the wide angle end and that at the telephoto end is large in the first lens unit, having at least one aspheric surface in the first lens unit facilitates correction of aberrations at both the wide angle end and the telephoto end.

It is preferred that a third lens unit having an aspheric surface be disposed on the image side of the second lens unit, and that the distance between the second lens unit and the third lens unit change during zooming from the wide angle end to the telephoto end.

Since the difference between the height of off-axis rays at the wide angle end and that at the telephoto end is large in the third lens unit, having at least one aspheric surface in the third lens unit facilitates correction of aberrations at both the wide angle end and the telephoto end.

It is preferred, in order to make the entire length of the zoom lens during use short while achieving an adequate zoom ratio, that during zooming from the wide angle end to the telephoto end, the first lens unit move first toward the image side and thereafter toward the object side, and the second lens unit move only toward the object side.

Furthermore, in the case where the zoom lens has a third lens unit, the third lens unit may be moved only toward the object side, only toward the image side, along a locus that is convex toward the object side, or along a locus that is convex toward the image side.

If the third lens unit is moved in such away that it is located closest to the object side at an intermediate zoom position between the wide angle end and the telephoto end, control of the pupil position and correction of curvature of field can be attained by the movement of the third lens unit. This is advantageous in achieving adequate performance throughout the entire zoom range.

A flare stop may be provided in addition to the aperture stop in order to eliminate unwanted light that may cause ghost images, lens flare or the like. The flare stop may be disposed on the object side of the first lens unit, between the first lens unit and the second lens unit, if the zoom lens has a third lens unit, between the second lens unit and the third lens unit, if the zoom lens has a fourth lens unit, between the third lens unit and the fourth lens unit, or between the lens unit closest to the image side and the image plane. Alternatively, a frame member may be adapted to cut flare rays, or another member may be adapted to serve as a flare stop. Alternatively, a flare stop may be provided on a component in the optical system by direct printing or by painting. Alternatively, a sheet or the like may be attached on a component in the optical system to serve as a flare stop. The aperture of the flare stop may have various shapes such as circular, elliptical, rectangular, or polygonal shape, or the shape of the aperture may be defined by a curve specified by a mathematical function. The flare stop may be adapted to cut not only detrimental beams but also beams that may cause coma flare etc. in the peripheral region of the picture area.

Anti-reflection coating may be applied on each lens to reduce ghost images and lens flare. The use of multi-layer coating, which can reduce ghost images and lens flare effectively, is desirable. Coating for cutting infrared light may be applied on a lens surface (s) and/or the cover glass etc.

It is preferred that a third lens unit be provided as a focusing lens unit that performs focusing. Since the third lens unit is light in weight, performing focusing by this lens unit makes the load on the motor small. In addition, performing focusing by this lens unit is advantageous in making the lens frame compact, because the entire length of the zoom lens does not change during focusing and the driving motor can be disposed inside the lens frame. Although it is preferred that focusing be performed by the third lens unit as described above, focusing may be performed by the first, by the second, or, if the zoom lens has a fourth lens unit, by the fourth lens unit. Alternatively, focusing may be performed by moving a plurality of lens units. Alternatively, focusing may be performed by advancing the entire lens system. Alternatively, focusing may be performed by shifting a part of the lenses forward or backward.

An image pickup apparatus according to the present invention comprises any one of the zoom lenses described in the foregoing and an image pickup element that is disposed on the image side of the zoom lens, has an image pickup surface for picking up an image formed by the zoom lens, and converts the image into an electrical signal.

Thus, there can be provided an image pickup apparatus equipped with a zoom lens that has a high zoom ratio and a high speed at the same time while having an adequate angle of view.

Brightness fall-off (or shading) in the peripheral region of picked up images may be reduced by shifting the positions of micro lenses that are arranged just in front of the image pickup surface of the image pickup element. For example, the design of the micro lenses on the CCD may be varied in accordance with changes in the angle of incidence of rays at different image heights. Brightness fall-off in the peripheral region of images may be compensated by image processing.

The optical system may intentionally be designed to have distortion, which may be corrected by electrical image processing after the image picking up.

It is preferred that two or more of the above-described features and conditional expressions be adopted in combination.

In cases where the zoom lens is provided with a focusing mechanism, the above-described features and conditional expressions should be interpreted as those in the state in which the zoom lens is focused at the farthest distance.

It is more preferred that the conditional expressions presented in the foregoing be modified as follows in order that the advantages can be enjoyed more surely.

In conditional expression (1), it is more preferred that the lower limit value be −1.00, still more preferably −0.99, and the upper limit value be −0.25, still more preferably −0.5.

In conditional expression (2), it is more preferred that the lower limit value be 45, still more preferably 48, and the upper limit value be 90, still more preferably 98.

In conditional expression (3), it is more preferred that the lower limit value be 0.09, and the upper limit value be 0.18, still more preferably 0.15.

In conditional expression (4), it is more preferred that the upper limit value be 0.28.

In conditional expression (5), it is more preferred that the lower limit value be 0.26, and the upper limit value be 0.45, still more preferably 0.40.

In conditional expression (6), it is more preferred that the lower limit value be 0.65, still more preferably 0.70, and the upper limit value be 0.95, still more preferably 0.90.

In conditional expression (7), it is more preferred that the lower limit value be 1.5, still more preferably 1.6, and the upper limit value be 1.9, still more preferably 1.8.

In conditional expression (8), it is more preferred that the lower limit value be 2.6, still more preferably 2.7, and the upper limit value be 3.4, still more preferably 3.3.

In conditional expression (9), it is more preferred that the lower limit value be 3.8, still more preferably 4.0, and the upper limit value be 6.4, still more preferably 6.2.

In conditional expression (10), it is more preferred that the lower limit value be 10.4, still more preferably 10.6, still more preferably 11.0, and the upper limit value be 11.8, still more preferably 11.65.

In conditional expression (11), it is more preferred that the lower limit value be 3.6, still more preferably 3.7, and the upper limit value be 4.8, still more preferably 4.6.

The zoom lens according to the present invention is a negative-lead type zoom lens, which is advantageous in achieving an adequate angle of view and a reduction in the collapsed size. The present invention can provide a negative-lead type zoom lens that is advantageous in achieving good optical performance even if it has a high zoom ratio and a high aperture ratio.

The present invention can also provide an image pickup apparatus equipped with such a zoom lens.

In the following, embodiments of the present invention will be described. All the zoom lenses according to the embodiments have the above-described inventive features, thereby achieving a wide angle of view at the wide angle end, brightness (or high lens speed), and good optical performance.

When the zoom lens according to each embodiment is used as a taking lens of a digital camera, the digital camera having a wide angle of view, high lens speed, and good optical performance can be provided. The zoom lenses according to the embodiments may also be used in a surveillance camera or a video camera.

Specifically, the zoom lenses according to the embodiments have a fast F-number of approximately 1.8 at the wide angle end, a wide angle of view of approximately 75° at the wide angle end, a zoom ratio of approximately 4, and good imaging performance. The zoom lenses are compact and can be slimmed in the collapsed state.

By using such a zoom lens, an image pickup apparatus that is portable, can be used in various shooting situations, and has good imaging performance can be provided.

In the following, zoom lenses and image pickup apparatuses equipped with the same will be described as exemplary embodiments. In the first to sixth embodiments, the effective image pickup area has a fixed rectangular shape throughout the entire zoom range. The numerical values associated with the conditional expressions presented below for each embodiment are for the state in which the zoom lens is focused on an object at infinity. The entire length refers to the value obtained by adding the back focus to the distance from the incidence surface to the exit surface of the zoom lens on the optical axis, where the back focus is represented by the equivalent air distance.

In the following, embodiments of the zoom lens and the image pickup apparatus according to the present invention will be described in detail with reference to the drawings. It should be understood that the present invention is not limited by the embodiments.

FIGS. 1 to 6 respectively show cross sectional views of the zoom lenses according to the first to sixth embodiments of the present invention at the wide angle end in the state in which the zoom lenses are focused on an object point at infinity. FIGS. 1 to 6 also show how the lens units move during zooming from the wide angle end to the telephoto end.

The zoom lenses according to the first to fourth embodiments each include, in order from the object side to the image side, a first lens unit G1 having a negative refracting power, a second lens unit G2 having a positive refracting power, a third lens unit G3 having a positive refracting power, and a fourth lens unit G4 having a positive refracting power. An aperture stop S is disposed on the object side of the second lens unit G2 and moves integrally with the second lens unit G2 during zooming from the wide angle end to the telephoto end.

A low pass filter F on which IR cut coating is applied and a cover glass C for the CCD (or CMOS) sensor are disposed on the image side of the fourth lens unit G4. The image plane I is formed on the image pickup surface of the CCD.

The zoom lens according to the fifth embodiment includes, in order from the object side to the image side, a first lens unit G1 having a negative refracting power, a second lens unit G2 having a positive refracting power, a third lens unit G3 having a positive refracting power, and a fourth lens unit G4 having a negative refracting power. An aperture stop S is disposed on the object side of the second lens unit G2 and moves integrally with the second lens unit G2 during zooming from the wide angle end to the telephoto end.

A low pass filter F on which IR cut coating is applied and a cover glass C for the CCD (or CMOS) sensor are disposed on the image side of the fourth lens unit G4. The image plane I is formed on the image pickup surface of the CCD.

The zoom lens according to the sixth embodiment includes, in order from the object side to the image side, a first lens unit G1 having a negative refracting power, a second lens unit G2 having a positive refracting power, and a third lens unit G3 having a positive refracting power. An aperture stop S is disposed on the object side of the second lens unit G2 and moves integrally with the second lens unit G2 during zooming from the wide angle end to the telephoto end.

A low pass filter F on which IR cut coating is applied and a cover glass C for the CCD (or CMOS) sensor are disposed on the image side of the third lens unit G3. The image plane I is formed on the image pickup surface of the CCD.

How the lens units in the zoom lenses according to the first to the sixth embodiments move is indicated by the arrows in FIGS. 1 to 6.

The first lens unit G1 moves first toward the image side and thereafter toward the object side so that it is located closer to the image side at the telephoto end than at the wide angle end.

The second lens unit G2 moves only toward the object side.

The third lens unit G3 moves first toward the object side and thereafter toward the image side so that it is located closer to the image side at the telephoto end than at the wide angle end.

In the first to fifth embodiments, the fourth lens unit G4 is fixed during zooming.

The distance between the first lens unit G1 and the second lens unit G2 continuously decreases during zooming from the wide angle end to the telephoto end.

The distance between the second lens unit G2 and the third lens unit G3 continuously increases during zooming from the wide angle end to the telephoto end.

Focusing from the infinite distance toward a short distance is performed by moving the third lens unit G3 toward the object side.

The aperture stop S has an opening with a variable aperture size to change the F-number. The F-number specified in numerical examples presented later refers to the smallest F-number in the variable range.

In the following, the configurations of the lens units in each embodiment will be described.

The zoom lens according to the first embodiment has a configuration as shown in FIG. 1 and specified by numerical data that will be presented later.

The first lens unit G1 is composed, in order from the object side, of a negative meniscus lens having an aspheric concave image side surface facing the image side, a biconcave negative lens, and a positive meniscus lens having a convex surface facing the object side.

The second lens unit G2 is composed, in order from the object side, of a biconvex positive lens having aspheric surfaces on both sides, a cemented lens component made up of a positive meniscus lens having a convex surface facing the object side and a negative meniscus lens having a concave surface facing the image side, and a cemented lens component made up of a biconcave negative lens and a biconvex positive lens having an aspheric image side surface.

The third lens unit G3 is composed of a cemented lens component made up of a biconvex positive lens and a negative meniscus lens having a convex surface facing the image side, arranged in order from the object side.

The fourth lens unit G4 is composed of a positive meniscus lens having an aspheric convex object side surface facing the object side.

The aperture stop S is disposed on the object side of the first lens of the second lens unit G2.

Figure 2:
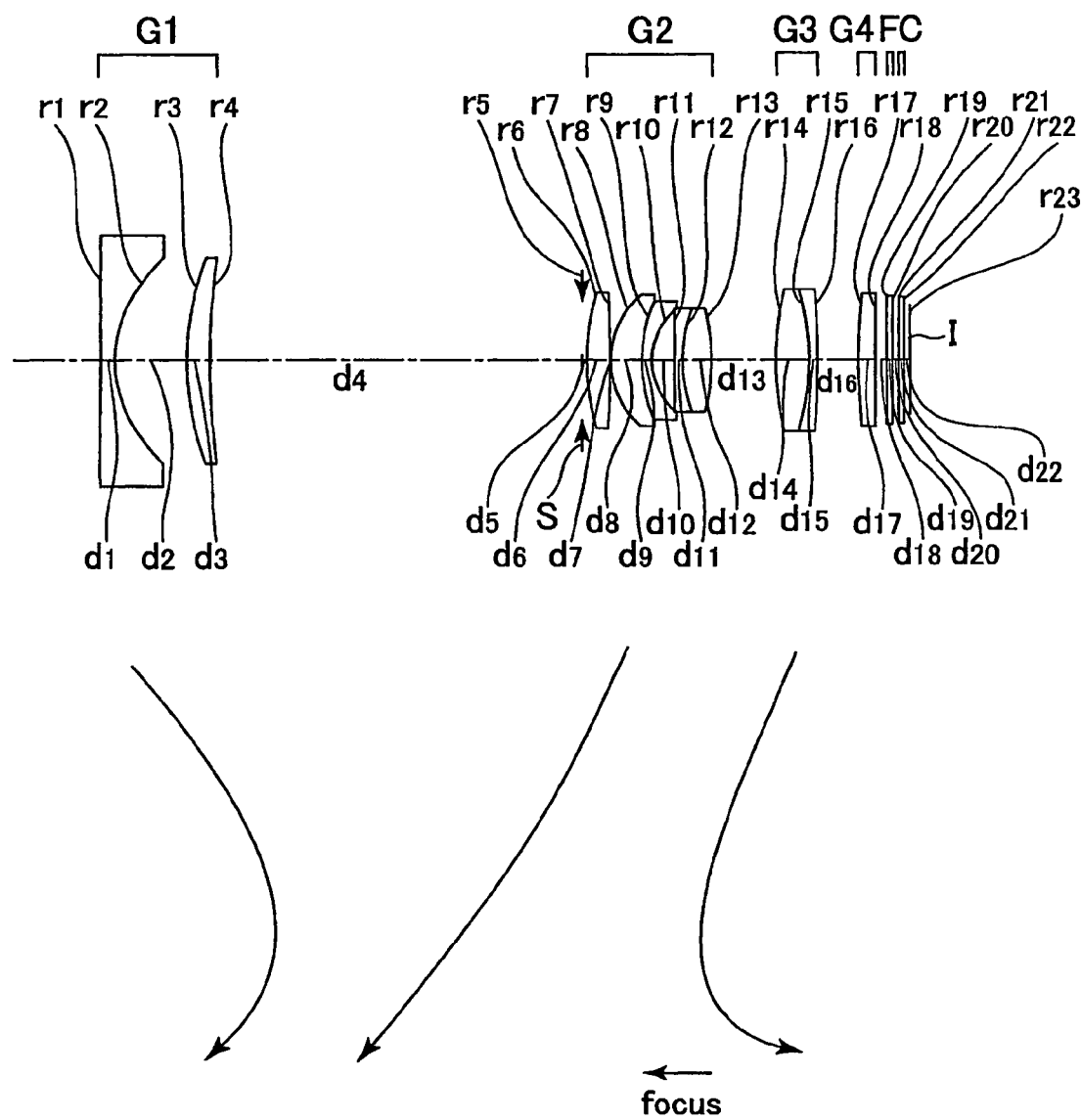
FIG. 2 shows a zoom lens according to a second embodiment of the present invention in the same manner as FIG. 1.

The zoom lens according to the second embodiment has a configuration as shown in FIG. 2 and specified by numerical data that will be presented later.

The first lens unit G1 is composed, in order from the object side, of a biconcave negative lens having aspheric surfaces on both sides, and a positive meniscus lens having a convex surface facing the object side.

The second lens unit G2 is composed, in order from the object side, of a biconvex positive lens having aspheric surfaces on both sides, a cemented lens component made up of a positive meniscus lens having a convex surface facing the object side and a negative meniscus lens having a concave surface facing the image side, and a cemented lens component made up of a biconcave negative lens and a biconvex positive lens having an aspheric image side surface.

The third lens unit G3 is composed of a cemented lens component made up of a biconvex positive lens and a negative meniscus lens having a convex surface facing the image side, arranged in order from the object side.

The fourth lens unit G4 is composed of a positive meniscus lens having an aspheric convex object side surface facing the object side.

The aperture stop S is disposed on the object side of the first lens of the second lens unit G2.

Figure 3:
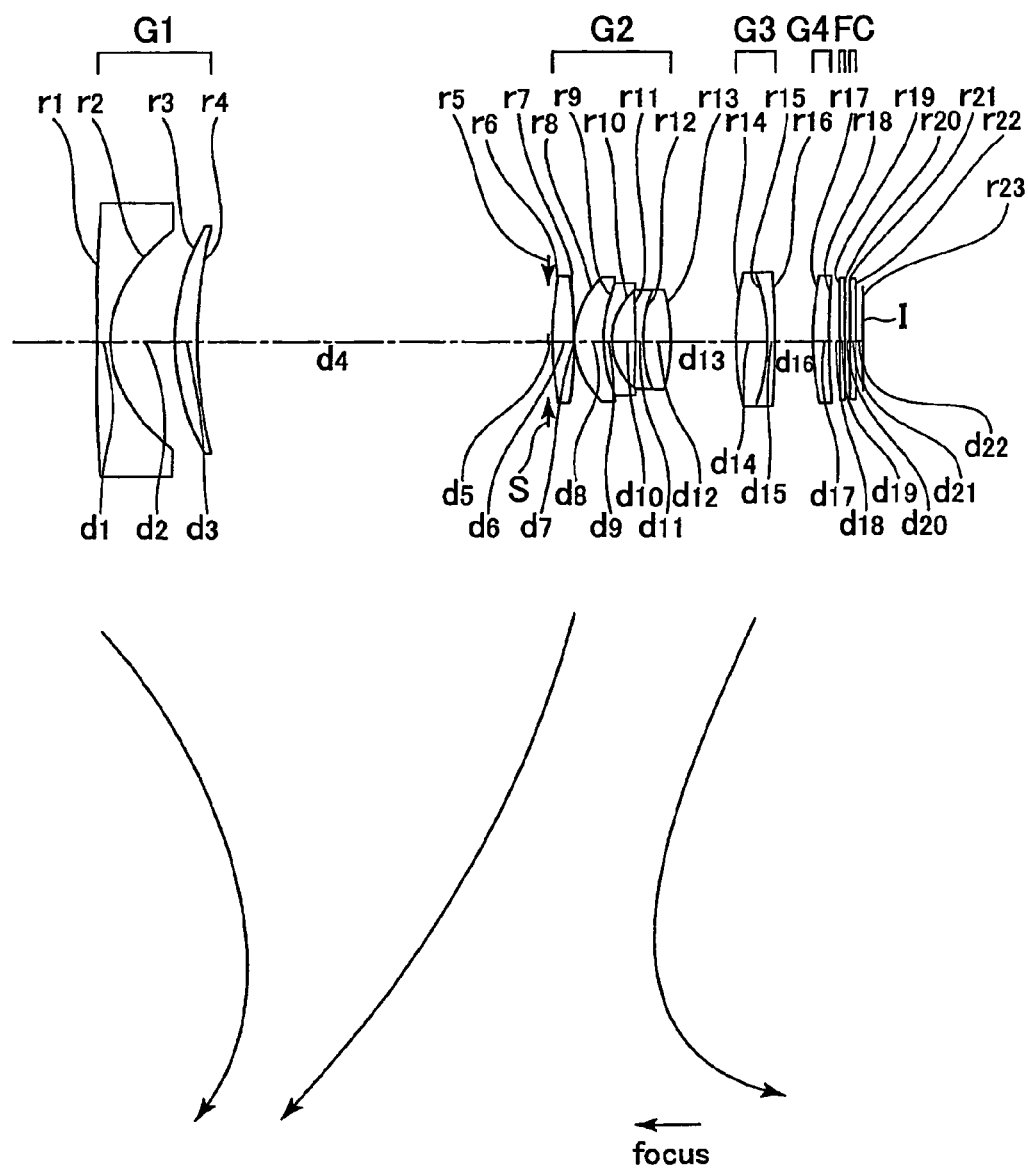
FIG. 3 shows a zoom lens according to a third embodiment of the present invention in the same manner as FIG. 1.
Figure 7A:
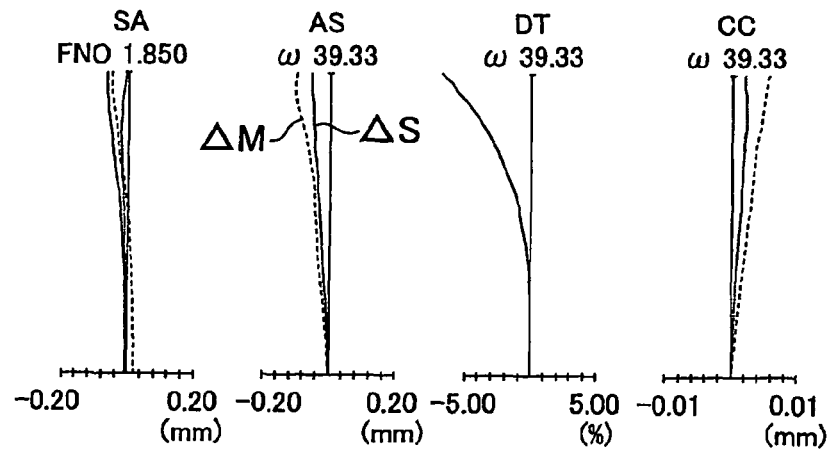
FIGS. 7A, 7B, and 7C are aberration diagrams of the zoom lens according to the first embodiment in the state in which the zoom lens is focused on an object point at infinity.
Figure 7B:
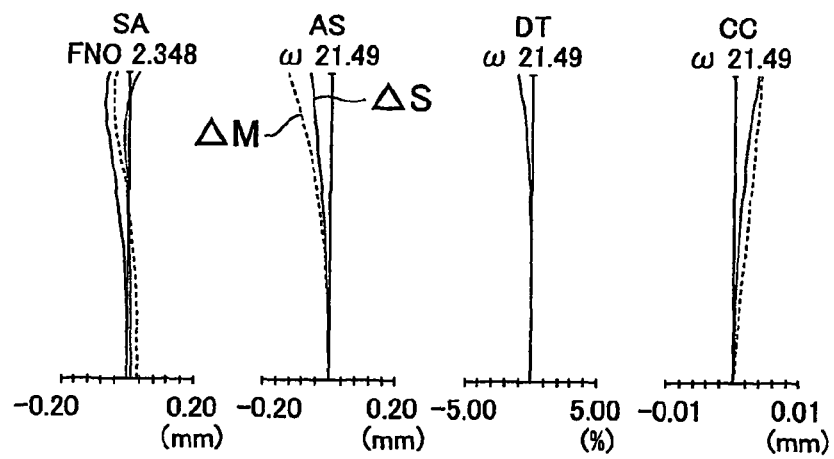
Figure 7C:
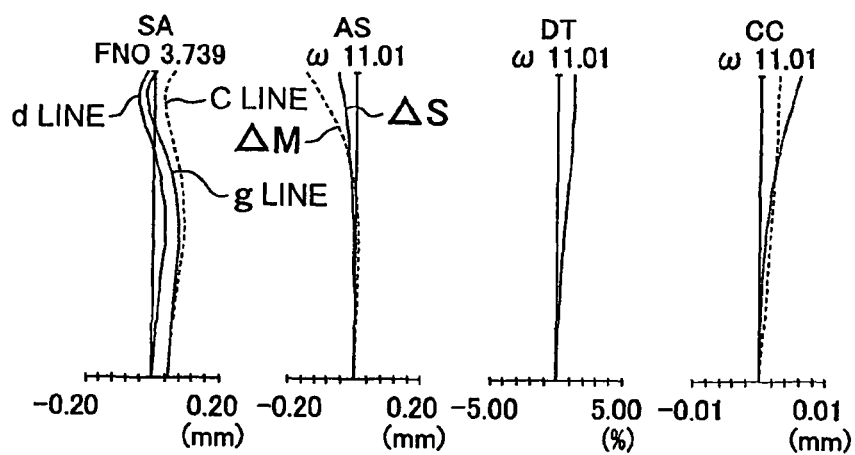
Figure 8A:
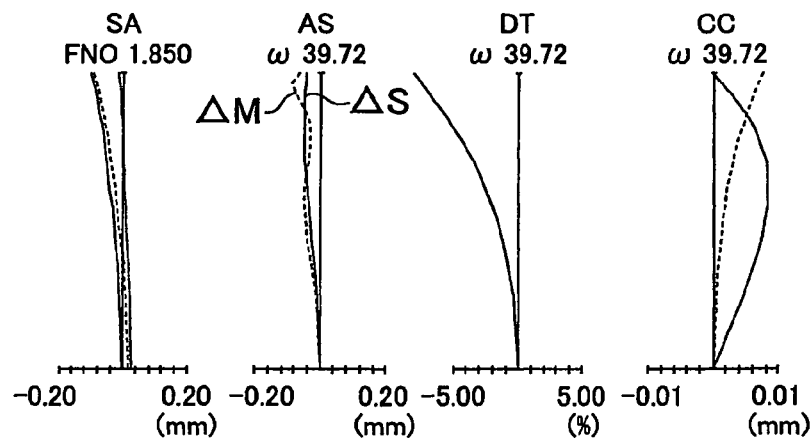
FIGS. 8A, 8B, and 8C are aberration diagrams of the zoom lens according to the second embodiment in the state in which the zoom lens is focused on an object point at infinity.
Figure 8B:
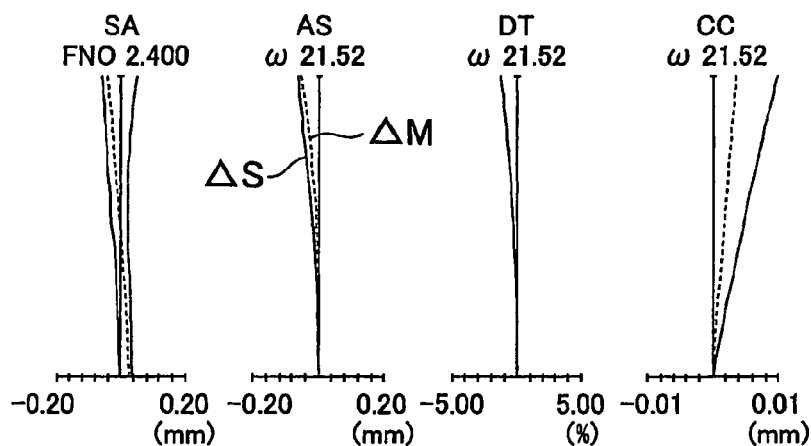
Figure 8C:
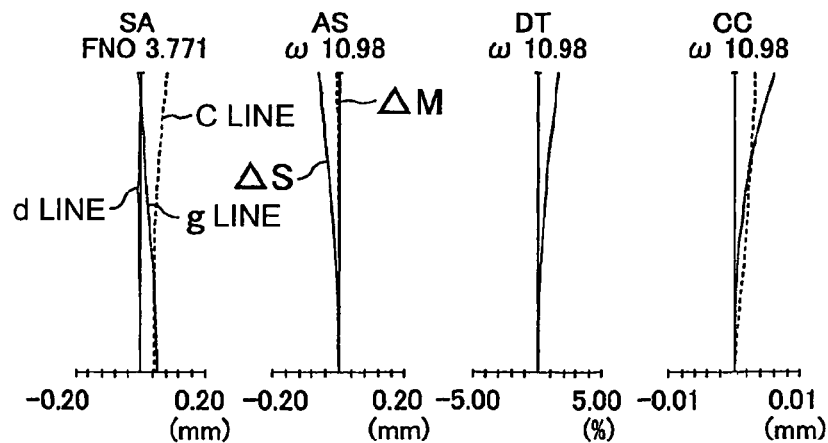
Figure 9A:
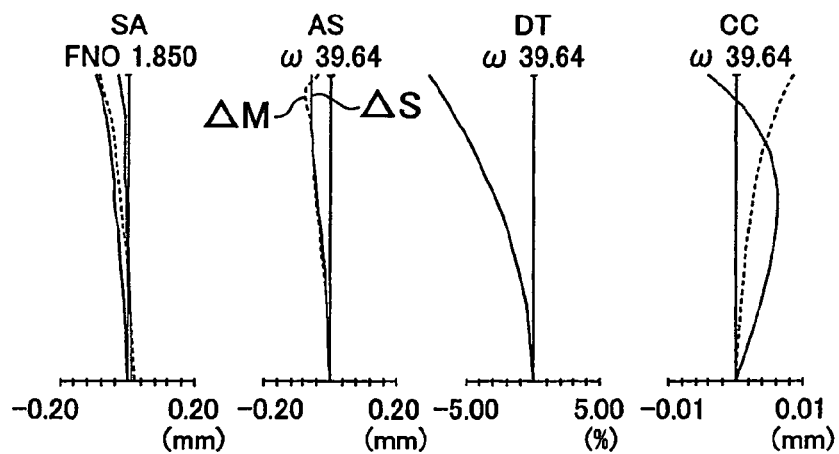
FIGS. 9A, 9B, and 9C are aberration diagrams of the zoom lens according to the third embodiment in the state in which the zoom lens is focused on an object point at infinity.
Figure 9B:
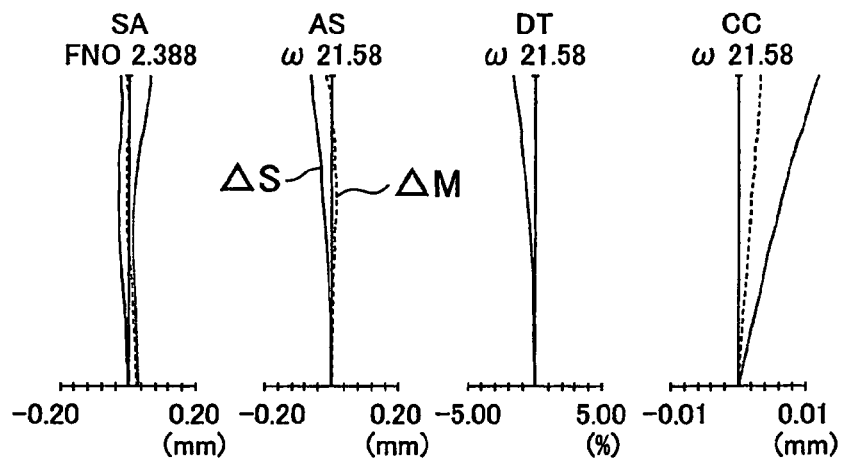
Figure 9C:
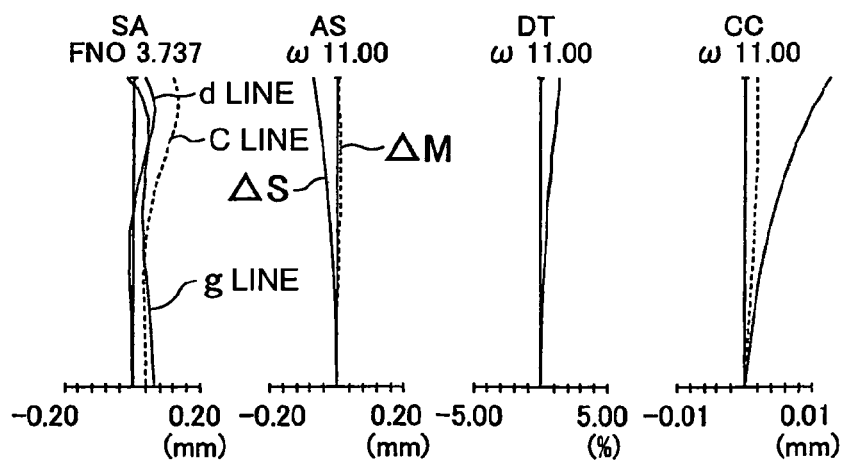
Figure 10A:
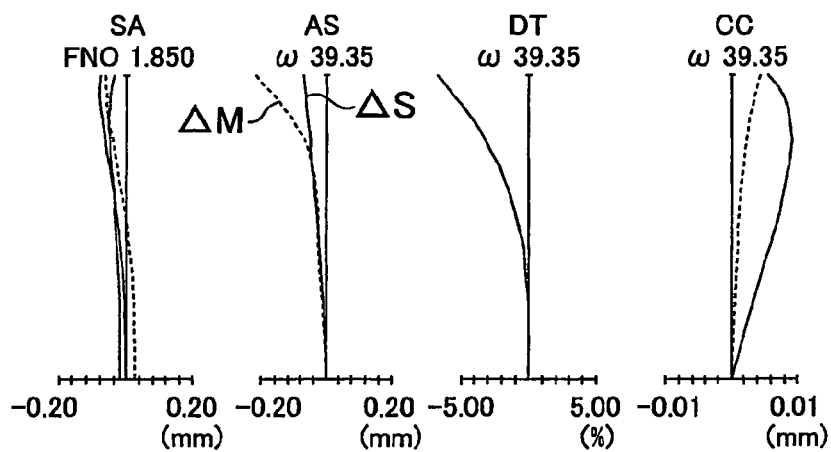
FIGS. 10A, 10B, and 10C are aberration diagrams of the zoom lens according to the fourth embodiment in the state in which the zoom lens is focused on an object point at infinity.
Figure 10B:
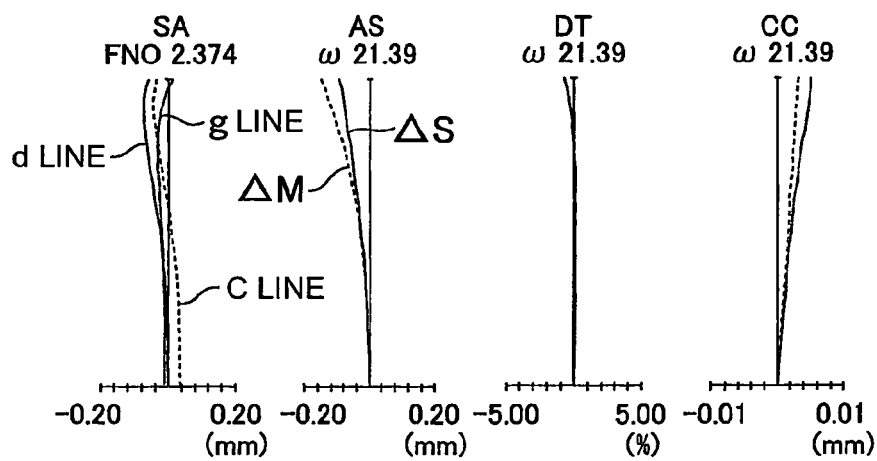
Figure 10C:
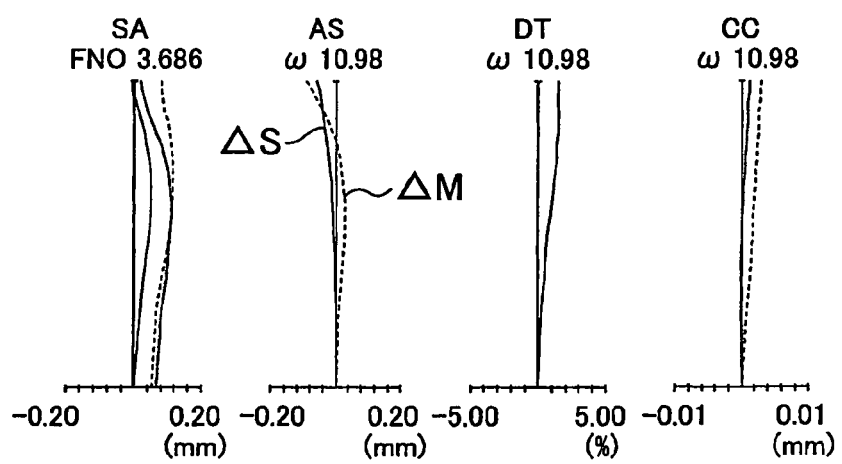
Figure 11A:
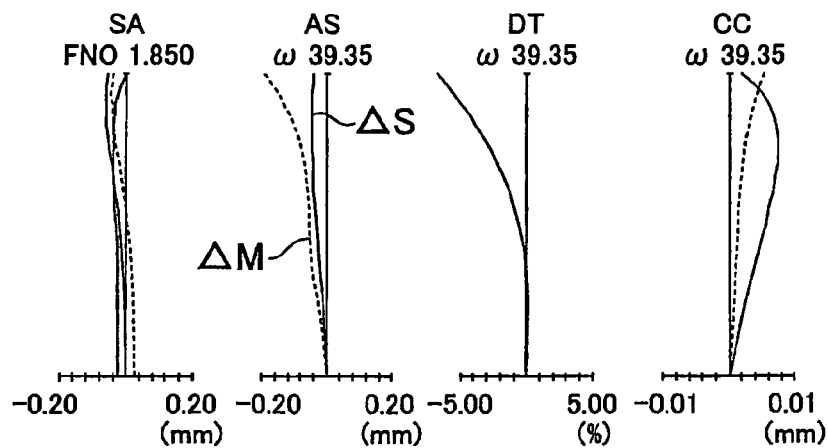
FIGS. 11A, 11B, and 11C are aberration diagrams of the zoom lens according to the fifth embodiment in the state in which the zoom lens is focused on an object point at infinity.
Figure 11B:
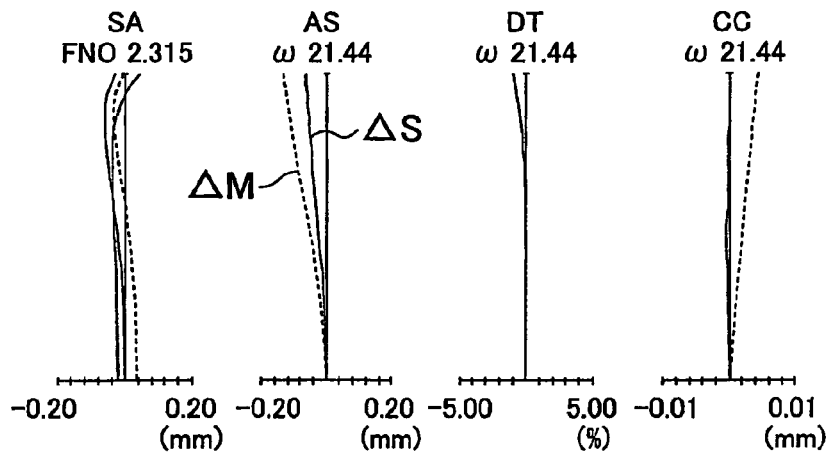
Figure 11C:
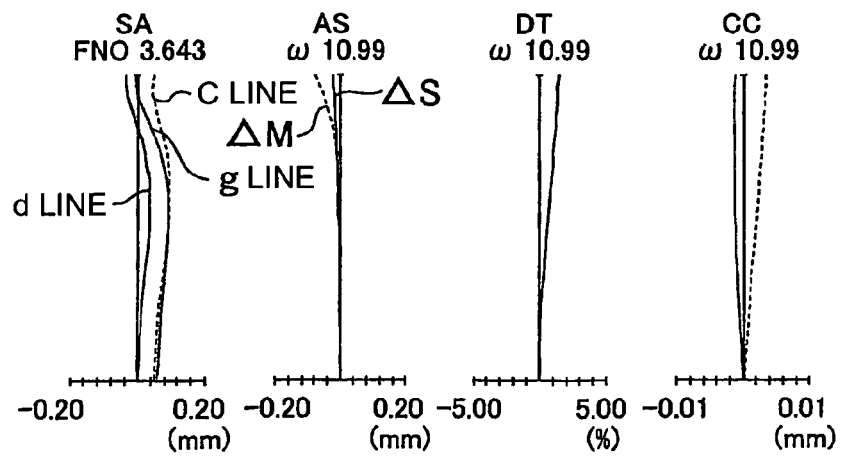
Figure 12A:
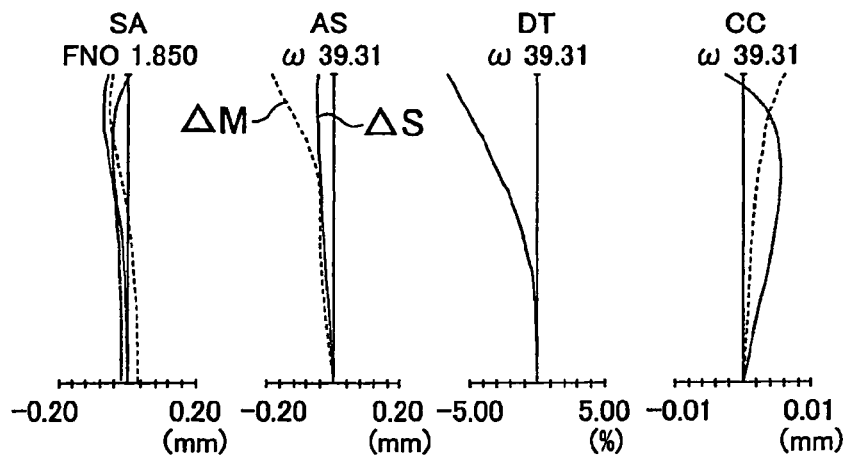
FIGS. 12A, 12B, and 12C are aberration diagrams of the zoom lens according to the sixth embodiment in the state in which the zoom lens is focused on an object point at infinity.
Figure 12B:
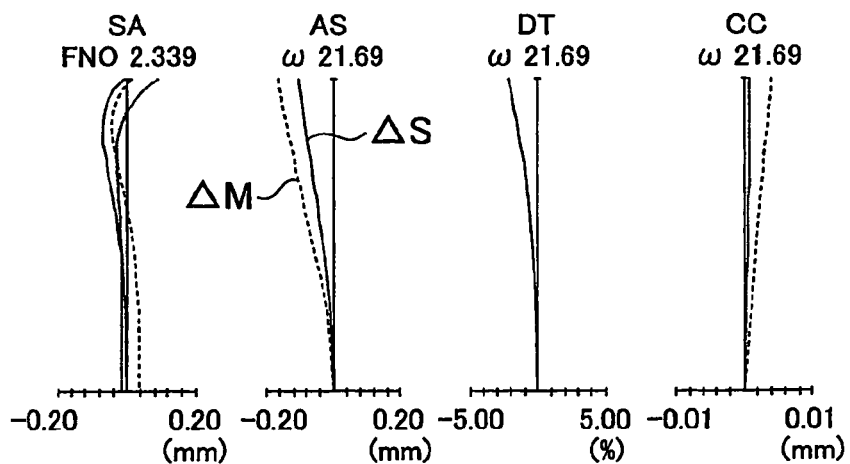
Figure 12C:
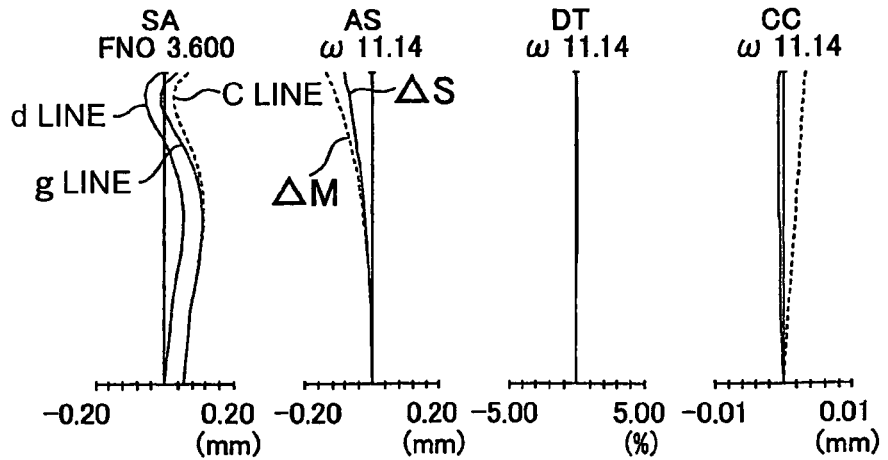

The zoom lens according to the third embodiment has a configuration as shown in FIG. 3 and specified by numerical data that will be presented later.

The first lens unit G1 is composed, in order from the object side, of a biconcave negative lens having aspheric surfaces on both sides, and a positive meniscus lens having a convex surface facing the object side.

The second lens unit G2 is composed, in order from the object side, of a biconvex positive lens having aspheric surfaces on both sides, a cemented lens component made up of a positive meniscus lens having a convex surface facing the object side and a negative meniscus lens having a concave surface facing the image side, and a cemented lens component made up of a biconcave negative lens and a biconvex positive lens having an aspheric image side surface.

The third lens unit G3 is composed of a cemented lens component made up of a biconvex positive lens and a negative meniscus lens having a convex surface facing the image side, arranged in order from the object side.

The fourth lens unit G4 is composed of a positive meniscus lens having an aspheric convex object side surface facing the object side.

The aperture stop S is disposed on the object side of the first lens of the second lens unit G2.

The zoom lens according to the fourth embodiment has a configuration as shown in FIG. 4 and specified by numerical data that will be presented later.

The first lens unit G1 is composed, in order from the object side, of a negative meniscus lens having an aspheric concave image side surface facing the image side, a biconcave negative lens, and a positive meniscus lens having a convex surface facing the object side.

The second lens unit G2 is composed, in order from the object side, of a biconvex positive lens having aspheric surfaces on both sides, a cemented lens component made up of a positive meniscus lens having a convex surface facing the object side and a negative meniscus lens having a concave surface facing the image side, and a cemented lens component made up of a biconcave negative lens and a biconvex positive lens having an aspheric image side surface.

The third lens unit G3 is composed of a biconvex positive lens.

The fourth lens unit G4 is composed of a positive meniscus lens having an aspheric convex object side surface facing the object side.

The aperture stop S is disposed on the object side of the first lens of the second lens unit G2.

The zoom lens according to the fifth embodiment has a configuration as shown in FIG. 5 and specified by numerical data that will be presented later.

The first lens unit G1 is composed, in order from the object side, of a negative meniscus lens having an aspheric concave image side surface facing the image side, a biconcave negative lens, and a positive meniscus lens having a convex surface facing the object side.

The second lens unit G2 is composed, in order from the object side, of a positive meniscus lens having aspheric surfaces on both sides and convex and convex toward the object side, a cemented lens component made up of a positive meniscus lens having a convex surface facing the object side and a negative meniscus lens having a concave surface facing the image side, and a cemented lens component made up of a biconcave negative lens and a biconvex positive lens having an aspheric image side surface.

The third lens unit G3 is composed of a biconvex positive lens.

The fourth lens unit G4 is composed of a negative plano-concave lens having an aspheric concave object side surface facing the object side.

The aperture stop S is disposed on the object side of the first lens of the second lens unit G2.

The zoom lens according to the sixth embodiment has a configuration as shown in FIG. 6 and specified by numerical data that will be presented later.

The first lens unit G1 is composed, in order from the object side, of a negative meniscus lens having an aspheric concave image side surface facing the image side, a negative meniscus lens having a convex surface facing the object side, and a positive meniscus lens having a convex surface facing the object side.

The second lens unit G2 is composed, in order from the object side, of a positive meniscus lens having aspheric surfaces on both sides and convex toward the object side, a cemented lens component made up of a positive meniscus lens having a convex surface facing the object side and a negative meniscus lens having a concave surface facing the image side, and a cemented lens component made up of a biconcave negative lens and a biconvex positive lens having an aspheric image side surface.

The third lens unit G3 is composed of a biconvex positive lens having an aspheric object side surface.

The aperture stop S is disposed on the object side of the first lens of the second lens unit G2.

Numerical data of each embodiment described above is shown below. Apart from symbols described above, f denotes a focal length of the entire zoom lens system, $F_{NO}$ denotes an F number, ω denotes a half angle of field, WE denotes a wide angle end, ST denotes an intermediate state, TE denotes a telephoto end, r denotes radius of curvature of each lens surface, d2 denotes a distance between two lenses, nd denotes a refractive index of each lens for a d-line, and vd2 denotes an Abbe constant for each lens. Further, * denotes an aspheric data.

When Z is let to be an optical axis with a direction of traveling of light as a positive (direction), and y is let to be in a direction orthogonal to the optical axis, a shape of the aspheric surface is described by the following expression.

$$Z=(y^2/r)/[1+\{1-(K+1)(y/r)^2\}^{1/2}]+A_4 y^4+A_6 y^6+A_8 y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'E-n' (where, n is an integral number) indicates '$10^{-n}$'.

Numerical Example 1 unit mm

Surface data

| Surface no. | r | d | nd | vd |
|---|---|---|---|---|
| 1 | 25.291 | 1.30 | 1.69350 | 53.21 |
| 2* | 11.457 | 4.65 | | |
| 3 | −91.230 | 1.20 | 1.88300 | 40.76 |
| 4 | 16.522 | 2.89 | | |
| 5 | 23.937 | 2.50 | 2.00069 | 25.46 |
| 6 | 156.171 | Variable | | |
| 7(Stop) | ∞ | 0.34 | | |
| 8* | 14.471 | 2.02 | 1.74320 | 49.34 |
| 9* | 113.908 | 0.10 | | |
| 10 | 8.370 | 2.60 | 1.77250 | 49.60 |
| 11 | 16.442 | 0.80 | 1.78470 | 26.29 |
| 12 | 6.111 | 1.98 | | |
| 13 | −140.383 | 0.70 | 1.60342 | 38.03 |
| 14 | 14.170 | 2.39 | 1.51633 | 64.14 |
| 15* | −17.560 | Variable | | |
| 16 | 26.031 | 2.90 | 1.72916 | 54.68 |
| 17 | −19.182 | 0.70 | 1.75520 | 27.51 |
| 18 | −109.567 | Variable | | |
| 19* | 30.351 | 1.50 | 1.58313 | 59.38 |
| 20 | 39.738 | 1.29 | | |
| 21 | ∞ | 0.50 | 1.54771 | 62.84 |
| 22 | ∞ | 0.50 | | |
| 23 | ∞ | 0.50 | 1.51633 | 64.14 |
| 24 | ∞ | 0.50 | | |
| Image plane(Image pickup plane) | ∞ | | | |

Aspherical surface data

2nd surface

K = −1.146
A4 = 4.02045E−05, A6 = 2.51202E−07, A8 = −1.66040E−09,
A10 = −9.07767E−13
8th surface

K = −0.729
A4 = 2.32080E−05, A6 = 3.54887E−07, A8 = 0.000, A10 = 0.000

-continued unit mm

9th surface

K = 0.000
A4 = 4.51977E−05, A6 = 3.40776E−07, A8 = 0.000, A10 = 0.000
15th surface K = 0.000
A4 = 2.11001E−05, A6 = −1.23026E−06, A8 = 0.000, A10 = 0.000
19th surface

K = 0.000
A4 = −1.27345E−04, A6 = 1.79933E−06, A8 = 0.000, A10 = 0.000

Zoom data(∞)

|  | WE | ST1 | ST2 | ST3 | TE |
|---|---|---|---|---|---|
| Focal length | 6.06 | 8.50 | 11.90 | 16.70 | 23.50 |
| Fno. | 1.85 | 2.04 | 2.35 | 2.76 | 3.74 |
| 2ω(°) | 78.66 | 58.58 | 42.98 | 31.13 | 22.03 |
| BF | 2.94 | 2.94 | 2.94 | 2.94 | 2.94 |
| Lens total length(in air) | 70.05 | 60.31 | 57.00 | 58.19 | 67.65 |
| Image height | 4.63 | 4.63 | 4.63 | 4.63 | 4.63 |
| d6 | 30.23 | 17.56 | 9.28 | 2.94 | 1.73 |
| d15 | 4.64 | 6.36 | 10.38 | 16.01 | 30.91 |
| d18 | 3.66 | 4.88 | 5.82 | 7.73 | 3.50 |
| Zoom ratio | 3.88 | | | | |

Unit focal length

| f1 = −18.78 | f2 = 18.72 | f3 = 30.11 | f4 = 208.09 |
|---|---|---|---|

Numerical Example 2 unit mm

Surface data

| Surface no. | r | d | nd | νd |
|---|---|---|---|---|
| 1* | −153.380 | 1.20 | 1.85135 | 40.10 |
| 2* | 10.688 | 6.20 | | |
| 3 | 25.676 | 1.97 | 1.94595 | 17.98 |
| 4 | 65.236 | Variable | | |
| 5(Stop) | ∞ | 0.34 | | |
| 6* | 19.232 | 2.01 | 1.74320 | 49.34 |
| 7* | −143.531 | 0.10 | | |
| 8 | 7.995 | 2.60 | 1.81600 | 46.62 |
| 9 | 13.368 | 0.86 | 1.80518 | 25.42 |
| 10 | 5.940 | 1.98 | | |
| 11 | −500.000 | 0.70 | 1.72151 | 29.23 |
| 12 | 13.109 | 2.50 | 1.51633 | 64.14 |
| 13* | −18.855 | Variable | | |
| 14 | 27.081 | 2.90 | 1.72916 | 54.68 |
| 15 | −22.521 | 0.70 | 1.75520 | 27.51 |
| 16 | −85.481 | Variable | | |
| 17* | 42.501 | 1.50 | 1.58313 | 59.38 |
| 18 | 5293.592 | 1.00 | | |
| 19 | ∞ | 0.50 | 1.54771 | 62.84 |
| 20 | ∞ | 0.50 | | |
| 21 | ∞ | 0.50 | 1.51633 | 64.14 |
| 22 | ∞ | 0.50 | | |
| Image plane(Image pickup plane) | ∞ | | | |

Aspherical surface data

1st surface

K = 0.000
A4 = 6.37238E−05, A6 = −6.54835E−07, A8 = 4.03157E−09,
A10 = −1.09254E−11

-continued unit mm

2nd surface

K = −0.946
A4 = 5.66356E−05, A6 = −2.14616E−07, A8 = 0.000, A10 = 0.000
6th surface K = −1.084
A4 = −1.19254E−05, A6 = −5.23897E−07, A8 = 0.000, A10 = 0.000
7th surface K = 0.000
A4 = 1.80444E−06, A6 = −4.52219E−07, A8 = 0.000, A10 = 0.000
13th surface K = 0.000
A4 = 2.49051E−05, A6 = −8.13475E−07, A8 = 0.000, A10 = 0.000
17th surface

K = 0.000
A4 = −9.38811E−05, A6 = 0.000, A8 = 0.000, A10 = 0.000

Zoom data(∞)

|  | WE | ST1 | ST2 | ST3 | TE |
|---|---|---|---|---|---|
| Focal length | 6.06 | 8.51 | 11.90 | 16.72 | 23.50 |
| Fno. | 1.85 | 2.06 | 2.40 | 2.79 | 3.77 |
| 2ω(°) | 79.43 | 58.93 | 43.03 | 31.03 | 21.95 |
| BF | 2.66 | 2.66 | 2.66 | 2.66 | 2.66 |
| Lens total length(in air) | 69.63 | 59.83 | 56.63 | 56.97 | 65.92 |
| Image height | 4.63 | 4.63 | 4.63 | 4.63 | 4.63 |
| d4 | 32.23 | 19.19 | 10.76 | 3.45 | 2.04 |
| d13 | 5.57 | 7.89 | 12.61 | 17.87 | 32.16 |
| d16 | 3.61 | 4.53 | 5.05 | 7.44 | 3.50 |
| Zoom ratio | 3.88 | | | | |

Unit focal length

| f1 = −19.36 | f2 = 19.39 | f3 = 29.27 | f4 = 73.47 |
|---|---|---|---|

Numerical Example 3 unit mm

Surface data

| Surface no. | r | d | nd | νd |
|---|---|---|---|---|
| 1* | −282.325 | 1.20 | 1.85135 | 40.10 |
| 2* | 10.755 | 5.86 | | |
| 3 | 22.023 | 1.97 | 1.94595 | 17.98 |
| 4 | 43.142 | Variable | | |
| 5(Stop) | ∞ | 0.34 | | |
| 6* | 25.472 | 1.94 | 1.74320 | 49.34 |
| 7* | −61.633 | 0.10 | | |
| 8 | 8.004 | 2.60 | 1.81600 | 46.62 |
| 9 | 13.838 | 0.72 | 1.76182 | 26.52 |
| 10 | 6.145 | 2.10 | | |
| 11 | −100.000 | 0.70 | 1.69895 | 30.13 |
| 12 | 13.741 | 2.50 | 1.51633 | 64.14 |
| 13* | −17.837 | Variable | | |
| 14 | 28.330 | 2.90 | 1.72916 | 54.68 |
| 15 | −18.314 | 0.70 | 1.75520 | 27.51 |
| 16 | −77.317 | Variable | | |
| 17* | 25.780 | 1.50 | 1.58313 | 59.38 |
| 18 | 69.992 | 1.00 | | |
| 19 | ∞ | 0.50 | 1.54771 | 62.84 |
| 20 | ∞ | 0.50 | | |

-continued unit mm

| | | | | |
|---|---|---|---|---|
| 21 | ∞ | 0.50 | 1.51633 | 64.14 |
| 22 | ∞ | 0.67 | | |
| Image plane(Image pickup plane) | ∞ | | | |

Aspherical surface data

1st surface

K = 0.000
A4 = 6.30751E−05, A6 = −4.90264E−07, A8 = 2.49616E−09,
A10 = −5.98519E−12
2nd surface K = −0.866
A4 = 6.88861E−05, A6 = −1.04386E−07, A8 = 0.000, A10 = 0.000
6th surface K = −3.859
A4 = −2.73265E−05, A6 = −1.72763E−06, A8 = 0.000, A10 = 0.000
7th surface K = 0.000
A4 = −2.68318E−05, A6 = −1.58231E−06, A8 = 0.000, A10 = 0.000
13th surface K = 0.000
A4 = 3.51920E−05, A6 = 6.27719E−07, A8 = 0.000, A10 = 0.000
17th surface

K = 0.000
A4 = −6.43919E−05, A6 = 0.000, A8 = 0.000, A10 = 0.000

Zoom data(∞)

| | WE | ST1 | ST2 | ST3 | TE |
|---|---|---|---|---|---|
| Focal length | 6.06 | 8.51 | 11.90 | 16.70 | 23.50 |
| Fno. | 1.85 | 2.06 | 2.39 | 2.77 | 3.74 |
| 2ω(°) | 79.28 | 59.15 | 43.16 | 31.10 | 21.99 |
| BF | 2.82 | 2.82 | 2.82 | 2.82 | 2.82 |
| Lens total length(in air) | 69.70 | 56.93 | 66.56 | 60.02 | 57.40 |
| Image height | 4.63 | 4.63 | 4.63 | 4.63 | 4.63 |
| d4 | 32.34 | 19.38 | 11.01 | 3.77 | 2.35 |
| d13 | 5.92 | 8.24 | 12.98 | 18.23 | 32.78 |
| d16 | 3.51 | 4.46 | 5.01 | 7.46 | 3.50 |
| Zoom ratio | 3.88 | | | | |

Unit focal length

| | | | |
|---|---|---|---|
| f1 = −19.40 | f2 = 19.42 | f3 = 29.74 | f4 = 69.13 |

Numerical Example 4 unit mm

Surface data

| Surface no. | r | d | nd | vd |
|---|---|---|---|---|
| 1 | 24.314 | 1.30 | 1.58313 | 59.38 |
| 2* | 12.150 | 4.68 | | |
| 3 | −64.321 | 1.20 | 1.81600 | 46.62 |
| 4 | 13.543 | 3.20 | | |
| 5 | 22.750 | 2.51 | 2.00069 | 25.46 |
| 6 | 111.688 | Variable | | |
| 7(Stop) | ∞ | 0.34 | | |
| 8* | 16.371 | 2.09 | 1.74320 | 49.34 |
| 9* | −298.832 | 0.10 | | |
| 10 | 7.995 | 2.66 | 1.73400 | 51.47 |
| 11 | 15.184 | 0.80 | 1.76182 | 26.52 |
| 12 | 5.954 | 2.05 | | |
| 13 | −100.000 | 0.70 | 1.69895 | 30.13 |

-continued unit mm

| | | | | |
|---|---|---|---|---|
| 14 | 15.876 | 2.48 | 1.51633 | 64.14 |
| 15* | −15.347 | Variable | | |
| 16 | 18.758 | 2.02 | 1.48749 | 70.23 |
| 17 | −478.198 | Variable | | |
| 18* | 38.098 | 1.50 | 1.58313 | 59.38 |
| 19 | 484.097 | 1.01 | | |
| 20 | ∞ | 0.50 | 1.54771 | 62.84 |
| 21 | ∞ | 0.50 | | |
| 22 | ∞ | 0.50 | 1.51633 | 64.14 |
| 23 | ∞ | 0.51 | | |
| Image plane(Image pickup plane) | ∞ | | | |

Aspherical surface data

2nd surface

K = −1.739
A4 = 5.40475E−05, A6 = −4.01176E−08, A8 = −2.19141E−09,
A10 = −1.10922E−11
8th surface K = −0.988
A4 = 8.30299E−06, A6 = 8.04417E−07, A8 = 0.000, A10 = 0.000
9th surface K = 0.000
A4 = 2.97081E−05, A6 = 8.68368E−07, A8 = 0.000, A10 = 0.000
15th surface K = 0.000
A4 = 2.34582E−05, A6 = −6.75547E−07, A8 = 0.000, A10 = 0.000
18th surface

K = 0.000
A4 = −1.60966E−04, A6 = 2.52705E−06, A8 = 0.000, A10 = 0.000

Zoom data(∞)

| | WE | ST1 | ST2 | ST3 | TE |
|---|---|---|---|---|---|
| Focal length | 6.06 | 8.49 | 11.90 | 16.68 | 23.50 |
| Fno. | 1.85 | 2.05 | 2.37 | 2.80 | 3.69 |
| 2ω(°) | 78.71 | 58.45 | 42.79 | 31.04 | 21.97 |
| BF | 2.68 | 2.68 | 2.68 | 2.68 | 2.68 |
| Lens total length(in air) | 70.12 | 60.66 | 56.99 | 57.39 | 64.56 |
| Image height | 4.63 | 4.63 | 4.63 | 4.63 | 4.63 |
| d6 | 30.94 | 18.60 | 10.33 | 4.06 | 1.87 |
| d15 | 4.79 | 6.65 | 10.54 | 15.54 | 28.87 |
| d17 | 4.07 | 5.10 | 5.80 | 7.48 | 3.50 |
| Zoom ratio | 3.88 | | | | |

Unit focal length

| | | | |
|---|---|---|---|
| f1 = −18.61 | f2 = 18.04 | f3 = 37.08 | f4 = 70.83 |

Numerical Example 5 unit mm

Surface data

| Surface no. | r | d | nd | vd |
|---|---|---|---|---|
| 1 | 24.308 | 1.30 | 1.58313 | 59.38 |
| 2* | 12.456 | 4.68 | | |
| 3 | −73.175 | 1.20 | 1.81600 | 46.62 |
| 4 | 12.817 | 2.87 | | |
| 5 | 19.872 | 2.63 | 2.00069 | 25.46 |
| 6 | 70.108 | Variable | | |
| 7(Stop) | ∞ | 0.34 | | |

-continued unit mm

| | | | | |
|---|---|---|---|---|
| 8* | 15.669 | 1.99 | 1.74320 | 49.34 |
| 9* | 336.460 | 0.10 | | |
| 10 | 8.306 | 2.54 | 1.73400 | 51.47 |
| 11 | 16.309 | 0.80 | 1.76182 | 26.52 |
| 12 | 6.314 | 2.02 | | |
| 13 | −100.000 | 0.70 | 1.69895 | 30.13 |
| 14 | 19.390 | 2.50 | 1.51633 | 64.14 |
| 15* | −14.108 | Variable | | |
| 16 | 18.851 | 2.70 | 1.48749 | 70.23 |
| 17 | −36.406 | Variable | | |
| 18* | −38.875 | 1.00 | 1.58313 | 59.38 |
| 19 | ∞ | 1.00 | | |
| 20 | ∞ | 0.50 | 1.54771 | 62.84 |
| 21 | ∞ | 0.50 | | |
| 22 | ∞ | 0.50 | 1.51633 | 64.14 |
| 23 | ∞ | 0.50 | | |
| Image plane(Image pickup plane) | ∞ | | | |

Aspherical surface data

2nd surface

K = −1.898
A4 = 4.94412E−05, A6 = 5.12783E−08, A8 = −3.52831E−09,
A10 = −2.63880E−12
8th surface K = −0.869
A4 = 1.24216E−05, A6 = 1.18371E−06, A8 = 0.000, A10 = 0.000
9th surface K = 0.000
A4 = 4.55665E−05, A6 = 1.32355E−06, A8 = 0.000, A10 = 0.000
15th surface K = 0.000, A4 = 2.41865E−05, A6 = −8.36542E−07, A8 = 0.000,
A10 = 0.000
18th surface

K = 0.000
A4 = −1.81199E−04, A6 = 2.47633E−06, A8 = 0.000, A10 = 0.000

Zoom data(∞)

| | WE | ST1 | ST2 | ST3 | TE |
|---|---|---|---|---|---|
| Focal length | 6.06 | 8.49 | 11.90 | 16.69 | 23.50 |
| Fno. | 1.85 | 2.03 | 2.32 | 2.69 | 3.64 |
| 2ω(°) | 78.69 | 58.54 | 42.89 | 31.13 | 21.98 |
| BF | 2.65 | 2.65 | 2.65 | 2.65 | 2.65 |
| Lens total length(in air) | 69.68 | 59.93 | 56.02 | 56.53 | 64.50 |
| Image height | 4.63 | 4.63 | 4.63 | 4.63 | 4.63 |
| d6 | 30.79 | 18.20 | 9.73 | 3.26 | 2.01 |
| d15 | 4.96 | 6.91 | 10.69 | 16.07 | 28.97 |
| d17 | 3.92 | 4.79 | 5.57 | 7.17 | 3.49 |
| Zoom ratio | 3.89 | | | | |

Unit focal length

| f1 = −18.42 | f2 = 18.01 | f3 = 25.89 | f4 = −66.67 |
|---|---|---|---|

Numerical Example 6 unit mm

Surface data

| Surface no. | r | d | nd | vd |
|---|---|---|---|---|
| 1 | 34.112 | 1.30 | 1.58313 | 59.38 |
| 2* | 12.368 | 3.95 | | |
| 3 | 286.673 | 1.20 | 1.81600 | 46.62 |

-continued unit mm

| | | | | |
|---|---|---|---|---|
| 4 | 12.508 | 3.05 | | |
| 5 | 18.860 | 2.54 | 2.00069 | 25.46 |
| 6 | 49.543 | Variable | | |
| 7(Stop) | ∞ | 0.34 | | |
| 8* | 14.246 | 2.08 | 1.74320 | 49.34 |
| 9* | 110.904 | 0.10 | | |
| 10 | 8.707 | 2.65 | 1.73400 | 51.47 |
| 11 | 20.338 | 0.80 | 1.76182 | 26.52 |
| 12 | 6.410 | 2.05 | | |
| 13 | −100.000 | 0.70 | 1.69895 | 30.13 |
| 14 | 27.183 | 2.47 | 1.51633 | 64.14 |
| 15* | −13.747 | Variable | | |
| 16* | 18.255 | 2.02 | 1.48749 | 70.23 |
| 17 | −964.851 | Variable | | |
| 18 | ∞ | 0.50 | | |
| 19 | ∞ | 0.50 | | |
| 20 | ∞ | 0.50 | 1.51633 | 64.14 |
| 21 | ∞ | 0.50 | | |
| Image plane(Image pickup plane) | ∞ | | | |

Aspherical surface data

2nd surface

K = −1.932
A4 = 5.68534E−05, A6 = 1.77166E−07, A8 = −5.32735E−09,
A10 = 1.25988E−11
8th surface K = −0.653
A4 = 3.98657E−05, A6 = 1.08666E−06, A8 = 0.000, A10 = 0.000
9th surface K = 0.000
A4 = 8.14027E−05, A6 = 1.11740E−06, A8 = 0.000, A10 = 0.000
15th surface K = 0.000
A4 = 1.52141E−05, A6 = −7.78466E−07, A8 = 0.000, A10 = 0.000
16th surface

K = 0.000
A4 = −1.29499E−05, A6 = 2.77388E−07, A8 = 0.000, A10 = 0.000

Zoom data(∞)

| | WE | ST1 | ST2 | ST3 | TE |
|---|---|---|---|---|---|
| Focal length | 6.06 | 8.50 | 11.90 | 16.70 | 23.50 |
| Fno. | 1.85 | 2.04 | 2.34 | 2.74 | 3.60 |
| 2ω(°) | 78.61 | 59.11 | 43.38 | 31.45 | 22.29 |
| BF | 7.95 | 8.82 | 9.34 | 10.72 | 6.35 |
| Lens total length (in air) | 70.52 | 60.32 | 55.99 | 55.63 | 61.89 |
| Image height | 4.63 | 4.63 | 4.63 | 4.63 | 4.63 |
| d6 | 32.62 | 19.68 | 11.03 | 4.46 | 2.22 |
| d15 | 4.70 | 6.57 | 10.38 | 15.21 | 28.08 |
| d17 | 6.30 | 7.17 | 7.68 | 9.06 | 4.70 |
| Zoom ratio | 3.88 | | | | |

Unit focal length

| f1 = −18.82 | f2 = 18.01 | f3 = 36.78 |
|---|---|---|

FIGS. 7A, 7B, and 7C to 12A, 12B, and 12C are aberration diagrams of the zoom lenses according to the first to sixth embodiments respectively, in the state in which the zoom lenses are focused on an object point at infinity. These aberration diagrams show spherical aberration SA, astigmatism AS, distortion DT, and chromatic aberration of magnification CC respectively at the wide angle end in FIGS. 7A, 8A, 9A, 10A, 11A and 12A, in an intermediate focal length state ("intermediate 2" in numerical data) in FIGS. 7B, 8B, 9B, 10B, 11B and 12B, and at the telephoto end in FIGS. 7C, 8C, 9C, 10C, 11C and 12C. The sign "ω" in the diagrams represents half angle of view (in degrees).

In the following table, numerical values associated with conditional expressions (1) to (11) are presented for each of the embodiments.

|      | Example 1 | Example 2 | Example 3 |
|------|-----------|-----------|-----------|
| (1)  | −0.92     | −0.98     | −0.88     |
| (2)  | 49.42     | 56.11     | 54.11     |
| (3)  | 0.11      | 0.10      | 0.11      |
| (4)  | 0.27      | 0.27      | 0.27      |
| (5)  | 0.28      | 0.28      | 0.27      |
| (6)  | 0.87      | 0.89      | 0.87      |
| (7)  | 1.68      | 1.73      | 1.73      |
| (8)  | 3.09      | 3.20      | 3.20      |
| (9)  | 4.97      | 4.83      | 4.91      |
| (10) | 11.56     | 11.49     | 11.50     |
| (11) | 4.31      | 4.37      | 4.43      |

|      | Example 4 | Example 5 | Example 6 |
|------|-----------|-----------|-----------|
| (1)  | −0.89     | −0.88     | −0.88     |
| (2)  | 58.96     | 58.96     | 58.96     |
| (3)  | 0.11      | 0.11      | 0.11      |
| (4)  | 0.27      | 0.27      | 0.27      |
| (5)  | 0.29      | 0.29      | 0.30      |
| (6)  | 0.88      | 0.86      | 0.89      |
| (7)  | 1.66      | 1.64      | 1.68      |
| (8)  | 2.98      | 2.97      | 2.97      |
| (9)  | 6.12      | 4.27      | 6.07      |
| (10) | 11.57     | 11.50     | 11.64     |
| (11) | 3.88      | 3.89      | 3.59      |

The following feature may be adopted in the zoom lenses according to the embodiments.

In the zoom lenses according to the embodiments, barrel distortion occurs on the rectangular photoelectric conversion surface, at the wide angle end. Whereas, at the telephoto end and near the intermediate focal length state, distortion is suppressed.

To correct distortion electrically, the effective image pickup area is designed to have a barrel shape at the wide angle end and a rectangular shape near the intermediate focal length position and at the telephoto end. In addition, the effective image pickup area, which has been set in advance, is transformed into rectangular image information with reduced distortion by image transformation using image processing.

The maximum image height $IH_w$ at the wide angle end is designed to be smaller than the maximum image height $IH_s$ at the intermediate focal length state and the maximum image height $IH_t$ at the telephoto end.

With this feature, a further reduction in the effective diameters of the first lens unit and the second lens unit can be achieved. This is advantageous for reduction of the diameter of the zoom lens.

It is preferred that the image pickup apparatus have an image transformation section that transforms, by image processing, an electrical signal representing an image formed by the zoom lens into an image signal representing an image that is corrected in terms of color misregistration caused by chromatic aberration of magnification. By the electrical correction of chromatic aberration of magnification attributed to the zoom lens, better images can be obtained.

Since chromatic aberration of magnification changes depending on the zoom position, the focus position, and the stop value, it is preferred that displacement amounts of the image positions with the second and the third primary colors relative to the image position with the first primary color for every lens position (i.e. zoom position, focus position and stop value) be stored as correction data in a memory device. Such correction data may be referred to in accordance with the lens position. Thus, the second and third primary color signals that have been corrected in terms of displacement relative to the first primary color signal can be output.

A flare stop may be provided optionally in addition to the aperture stop in order to eliminate unwanted light that may cause ghost images, lens flare or the like.

The flare stop may be disposed on the object side of the first lens unit, between the first lens unit and the second lens unit, between the third lens unit and the fourth lens unit, or between the lens unit closest to the image plane and the image plane.

Alternatively, a frame member may be adapted to cut flare rays, or another member may be adapted to serve as a flare stop. Alternatively, a flare stop may be provided on a component in the optical system by direct printing, by painting, or by attaching a sheet or the like. The aperture of the flare stop may have various shapes such as circular, elliptical, rectangular, or polygonal shape, or the shape of the aperture may be defined by a curve specified by a mathematical function. The flare stop may be adapted to cut not only unwanted beams but also beams that may cause coma flare etc. in the peripheral region of the picture area.

Anti-reflection coating may be applied on a surface(s) of lens component(s) exposed to air and a cemented surface(s) in a cemented lens component(s) to reduce ghost images and lens flare. The use of multi-layer coating, which can reduce ghost images and lens flare effectively, is desirable. By selecting the coating material and film thickness of two or more coating layers in an appropriate combination, it is possible to further reduce the reflectance and to control spectral characteristics and angular characteristics of the reflectance. Coating for cutting infrared light may be applied on a lens surface(s) and/or the cover glass etc.

(Digital Camera)

Figure 13:
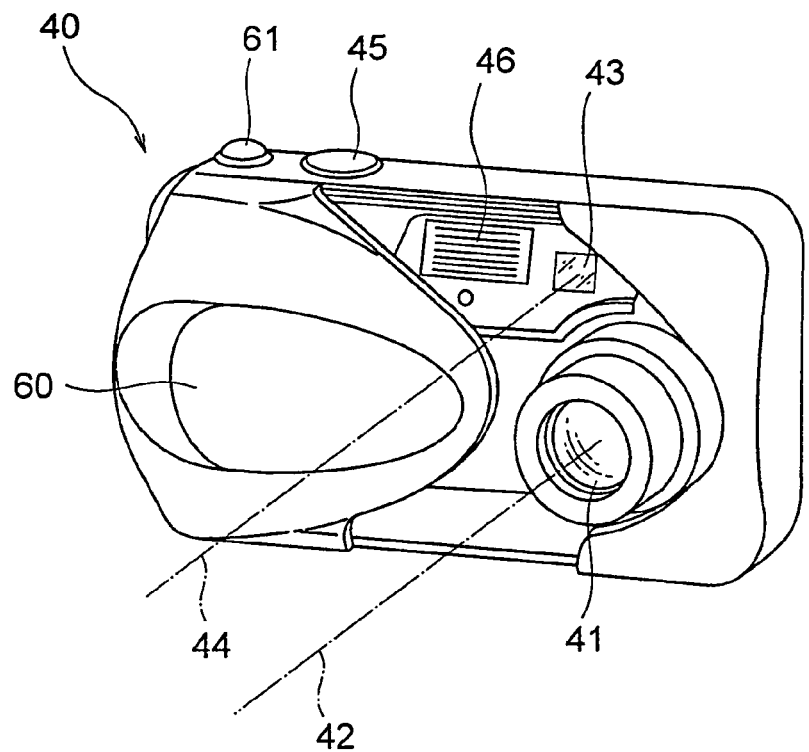
FIG. 13 is a front perspective view showing an outer appearance of a digital camera according to the present invention.
Figure 14:
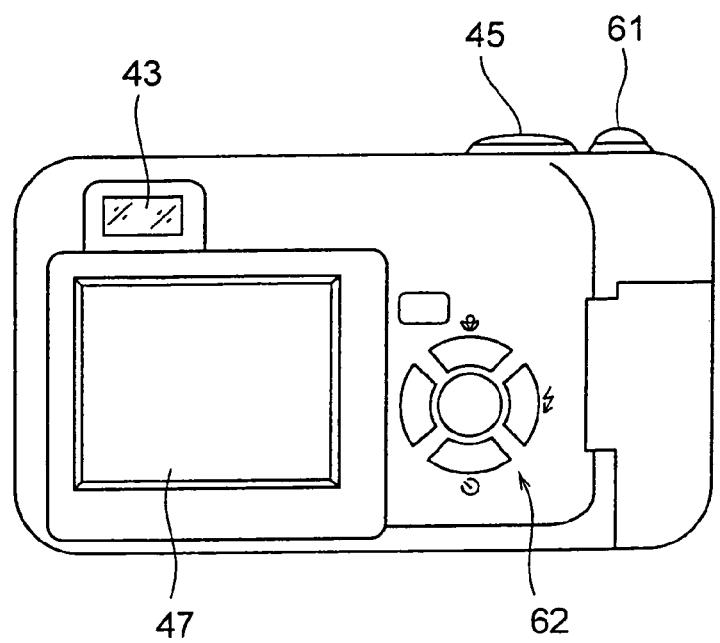
FIG. 14 is a rear view of the digital camera shown in FIG. 13.
Figure 15:
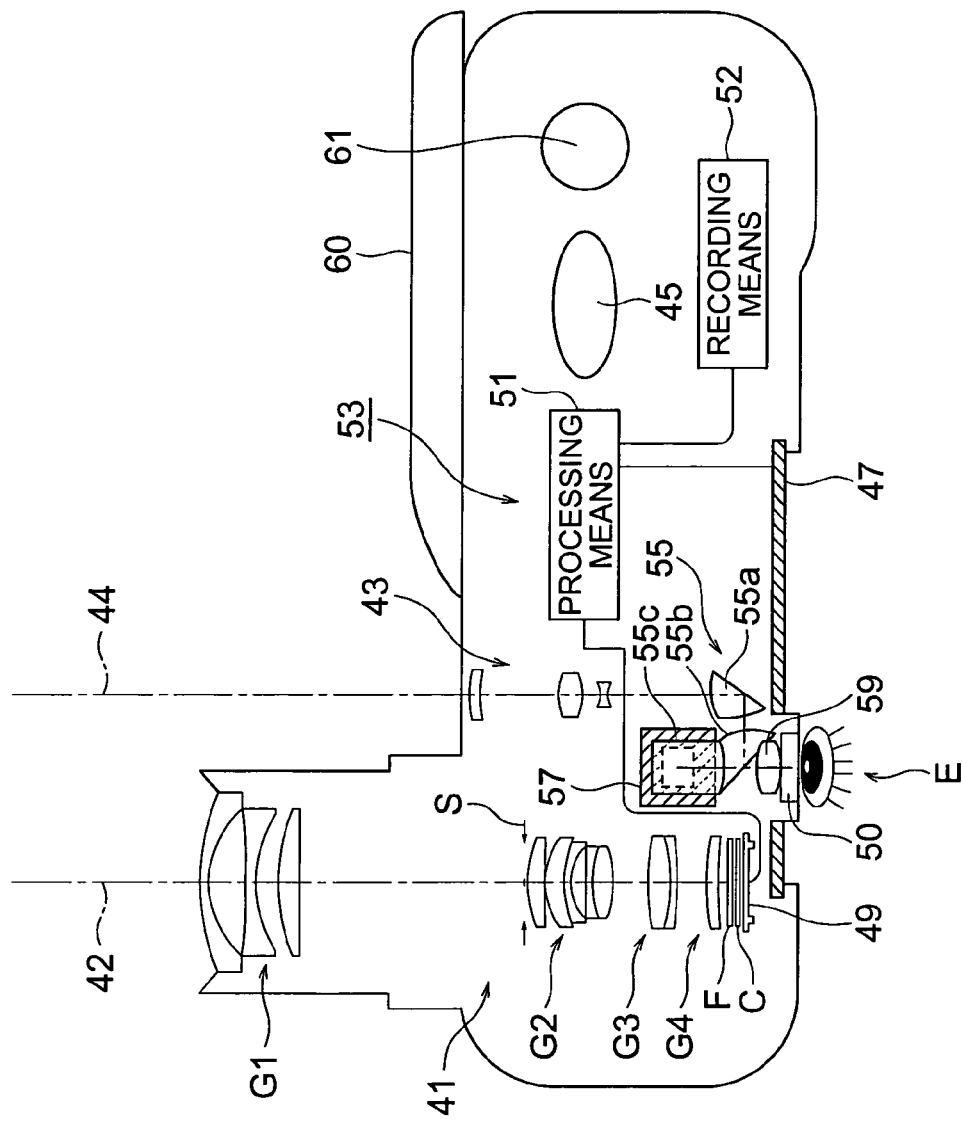
FIG. 15 is a partially opened-up view of the digital camera shown in FIG. 13.

FIG. 13 to FIG. 15 are conceptual diagrams of a structure of a digital camera according to the present invention in which a zoom lens system described above is incorporated in a taking optical system 41. FIG. 13 is a front perspective view showing an appearance of a digital camera 40, FIG. 14 is a rear view of the same, and FIG. 15 is a schematic cross-sectional view showing a structure of the digital camera 40. In FIG. 13 and FIG. 15, show an uncollapsed state of the taking optical system 41. The digital camera 40, in a case of this example, includes the taking optical system 41 having a taking optical path 42, a finder optical system 43 having a finder optical path 44, a shutter button 45, a flash 46, a liquid-crystal display monitor 47, a focal-length changing button 61, and a setting changing switch 62 etc., and in the uncollapsed state of the taking optical system 41, by sliding a cover 60, the taking optical system 41, the finder optical system 43, and the flash 46 are covered by the cover 60. Further, when the cover 60 is opened and the digital camera is set in a photo taking state, the taking optical system 141 assumes the uncollapsed state as shown in FIG. 15 (in figure, telephoto end state), when the shutter button 145 disposed on an upper portion of the digital camera 40 is pressed, in synchronization with the pressing of the shutter button 45, a photograph is taken by the taking optical system 41 such as the zoom lens system in the first embodiment. An object image formed by the taking optical system 41 is formed on an image pickup surface of a CCD 49 via a cover glass C and a low pass filter on which a wavelength region restricting coating is applied. An object image which is received as light by the CCD 49 is displayed on the liquid-crystal display monitor 47 which is provided on a rear surface of the digital camera 40 as an electronic image, via a processing means 51. Moreover, a recording means 52 is connected to the processing means 51, and it is also possible to record the electronic image which is taken. The recording means 52 may be provided separately from the processing means 51, or may be formed by recording by writing electronically in a flexible disc, a memory card, or an MO etc. Moreover, the camera may be formed as a silver-salt camera in which a silver-salt film is disposed instead of the CCD 49.

Furthermore, a finder objective optical system 53 is disposed on the finder optical path 44. The finder objective optical system 53 consists of a plurality of lens units (three units in the diagram), and two prisms (55a, 55b), and is made of a zoom optical system in which a focal length changes in synchronization with a zoom lens system of the taking optical system 41. An object image formed by the finder objective optical system 53 is formed on a field frame 57 of an erecting prism 55 which is an image erecting member. On a rear side of the erecting prism 55, prism (55c) is disposed, further, an eyepiece optical system 59 which guides an erected image to a viewer's eyeball, is disposed. A cover member 50 is disposed on an emergence side of the eyepiece optical system 59.

Since the digital camera 40 structured in such manner has the taking optical system 41 according to the present invention, has an extremely small thickness in collapsed state, and an extremely stable imaging performance in the entire zooming region at high magnification, it is possible to realize a high-performance, a small size, and a widening of angle of field.

(Internal Circuit Structure)

FIG. 23 is a structural block diagram of an internal circuit of main components of the digital camera 40. In the following description, the processing means 51 described above includes for instance, a CDS/ADC section 24, a temporary storage memory 17, and an image processing section 18, and a storage means 52 consists of a storage medium section 19 for example.

Figure 16:
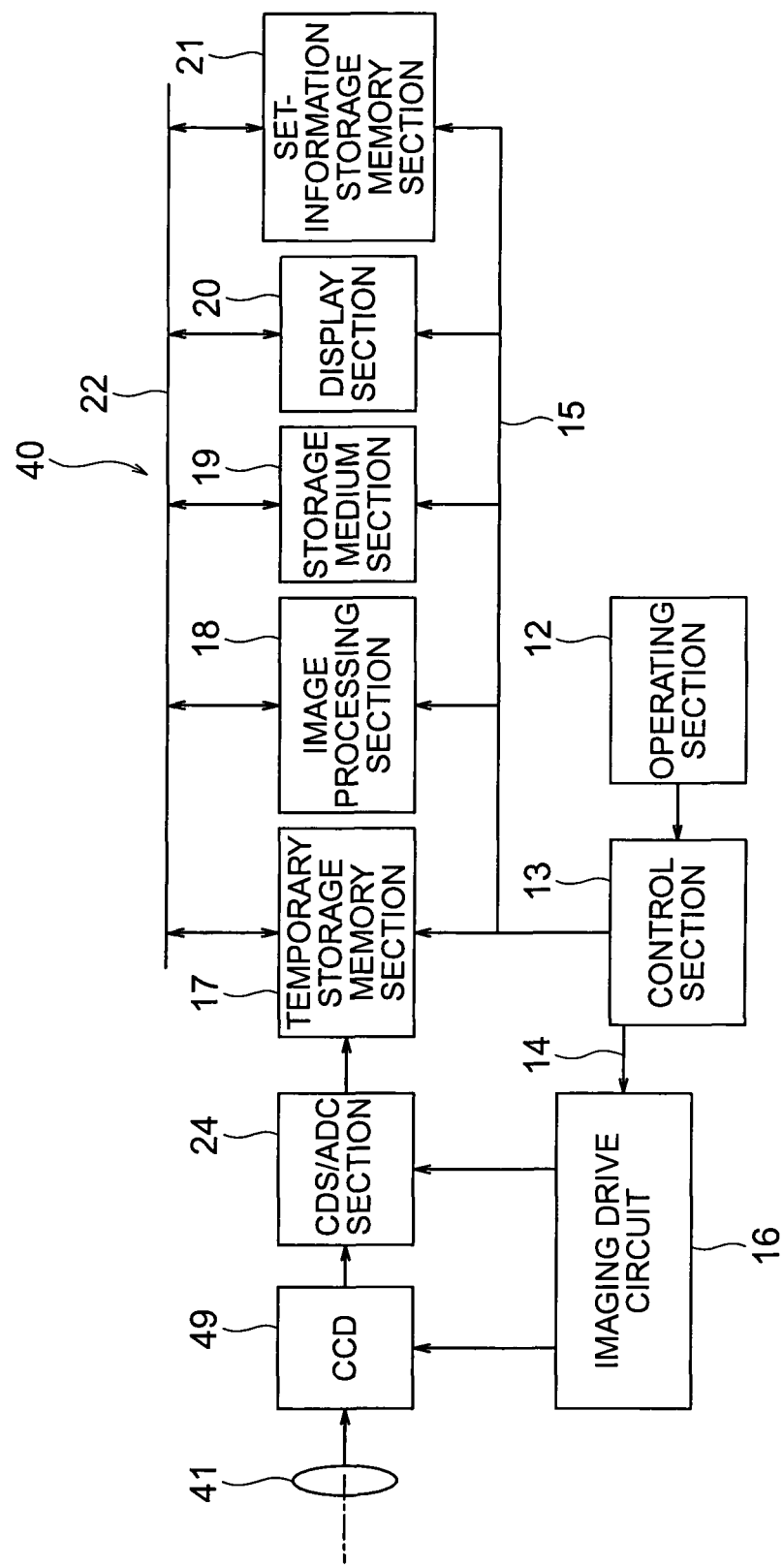
FIG. 16 is a block diagram of the relevant internal circuit of the digital camera shown in FIG. 13.

As shown in FIG. 16, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 119, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 13 is a circuit which controls the entire digital camera 40 upon receiving instructions and commands input by the user of the camera via the operating section 12, according to a computer program stored in this computer program memory.

The CCD 49 receives as light an object image which is formed via the taking optical system 41 according to the present invention. The CCD 49 is an image pickup element which is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (bare data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 is a control circuit of a device in which, the RAW data transferred from the temporary storage memory 117 and image data subjected to image processing in the image processing section 18 are recorded and maintained in the card flash memory and the stick flash memory.

The display section 120 includes the liquid-crystal display monitor, and is a circuit which displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section. The set-information storage memory section 21 is a circuit which controls an input to and an output from the memories.

By virtue of the present invention, the taking optical system 41 of the above-described digital camera 40 has an adequate wide angle of view and a high zoom ratio while being compact, and has very stable imaging performance throughout the entire zoom range in spite of its fast F-number. Therefore, brightness, high performance, compactness, and a wide angle of view can be achieved.

The invention claimed is:

1. A zoom lens comprising:
   a first lens unit having a negative refracting power disposed closest to the object side; and
   a second lens unit having a positive refracting power disposed on the image side of the first lens unit, wherein
   during zooming from the wide angle end to the telephoto end, a distance between the first lens unit and the second lens unit decreases,
   when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component,
   the zoom lens further comprises a third lens unit having a positive refracting power disposed on the image side of the second lens unit, and a fourth lens unit disposed on the image side of the third lens unit and having a lens surface that has different curvatures in a central portion and in a peripheral portion, and a distance between the second lens unit and the third lens unit and a distance between the third lens unit and the fourth lens unit change during zooming.

2. The zoom lens according to claim 1, wherein the image side surface of the first cemented lens component and the object side surface of the second cemented lens component are both concave surfaces.

3. A zoom lens comprising:

a first lens unit having a negative refracting power disposed closest to the object side; and a second lens unit having a positive refracting power disposed on the image side of the first lens unit, wherein during zooming from the wide angle end to the telephoto end, a distance between the first lens unit and the second lens unit decreases, when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component, the first cemented lens component and the second cemented lens component are arranged adjacent to each other, the image side surface of the first cemented lens component and the object side surface of the second cemented lens component are both concave surfaces, and further comprising a third lens unit having a positive refracting power disposed on the image side of the second lens unit, wherein a distance between the second lens unit and the third lens unit changes during zooming.

4. The zoom lens according to claim 3, wherein the second lens unit comprises a positive lens component having a positive refracting power disposed on the object side of the first cemented lens component.

5. The zoom lens according to claim 3, wherein the first cemented lens component comprises a positive lens element and a negative lens element arranged in order from the object side to the image side, the second cemented lens component comprises a negative lens element and a positive lens element arranged in order from the object side to the image side.

6. The zoom lens according to claim 3, wherein the first cemented lens component has a meniscus shape having a convex surface facing the object side and a concave surface facing the image side, and the second cemented lens component has a meniscus shape having a concave surface facing the object side and a convex surface facing the image side.

7. The zoom lens according to claim 3, wherein the first cemented lens component comprises a positive lens element and a negative lens element arranged in order from the object side to the image side, the second cemented lens component comprises a negative lens element and a positive lens element arranged in order from the object side to the image side, and the following conditional expression (2) is satisfied:

$$40 < vd2 < 100 \quad (2),$$

where vd2 is defined by the equation "vd2=(vdCL1p+vdCL2p)−(vdCL1n+vdCL2n)", where vdCL1p is an Abbe constant of the positive lens element in the first cemented lens component for the d-line, vdCL2p is an Abbe constant of the positive lens element in the second cemented lens component for the d-line, vdCL1n is an Abbe constant of the negative lens element in the first cemented lens component for the d-line, and vdCL2n is an Abbe constant of the negative lens element in the second cemented lens component for the d-line.

8. The zoom lens according to claim 3, wherein the first cemented lens component and the second cemented lens component in the second lens unit are arranged adjacent to each other, and the following conditional expression (3) is satisfied:

$$0.08 < D2/f2 < 0.20 \quad (3),$$

where D2 is a distance between the first cemented lens component and the second cemented lens component in the second lens unit on the optical axis, and f2 is a focal length of the second lens unit.

9. The zoom lens according to claim 3, wherein the second cemented lens component is disposed closest to the image side in the second lens unit, and a lens element located closest to the image side in the second cemented lens component is a positive lens element, and the image side surface of this positive lens element is an aspheric surface that is convex toward the image side.

10. The zoom lens according to claim 3, further comprising an aperture stop disposed at a certain position in a range from an air gap immediately in front of the object side end of the second lens unit to the image side surface of the second lens unit, wherein the aperture stop moves integrally with the second lens unit during zooming from the wide angle end to the telephoto end.

11. The zoom lens according to claim 3, wherein the first lens unit comprises an aspheric lens.

12. An image pickup apparatus comprising:

a zoom lens according to claim 3; and an image pickup element that is disposed on the image side of the zoom lens, has an image pickup surface for picking up an image formed by the zoom lens, and converts the image into an electrical signal.

13. A zoom lens comprising:

a first lens unit having a negative refracting power disposed closest to the object side; and a second lens unit having a positive refracting power disposed on the image side of the first lens unit, wherein during zooming from the wide angle end to the telephoto end, a distance between the first lens unit and the second lens unit decreases, when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component, the first cemented lens component and the second cemented lens component are arranged adjacent to each other, the image side surface of the first cemented lens component and the object side surface of the second cemented lens component are both concave surfaces, and the following conditional expression is satisfied:

$$-1.02 < SF2n < -0.1 \quad (1)$$

where SF2n is defined by the equation "SF2n=(R1r+R2f)/(R1r−R2f)", where R1r is a paraxial radius of curvature of the image side surface of the first cemented lens component, and R2f is a paraxial radius of curvature of the object side surface of the second cemented lens component.

14. A zoom lens comprising:
a first lens unit having a negative refracting power disposed closest to the object side; and
a second lens unit having a positive refracting power disposed on the image side of the first lens unit, wherein
during zooming from the wide angle end to the telephoto end, a distance between the first lens unit and the second lens unit decreases,
when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component,
the first cemented lens component and the second cemented lens component are arranged adjacent to each other,
the image side surface of the first cemented lens component and the object side surface of the second cemented lens component are both concave surfaces, and
the second lens unit comprises a single lens component having a positive refracting power and having an aspheric lens surface disposed on the object side of the first cemented lens component, and the total number of the lens components included in the second lens unit is three.

15. A zoom lens comprising:
a first lens unit having a negative refracting power disposed closest to the object side; and
a second lens unit having a positive refracting power disposed on the image side of the first lens unit, wherein
when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component,
the first cemented lens component and the second cemented lens component are arranged adjacent to each other,
the image side surface of the first cemented lens component and the object side surface of the second cemented lens component are both concave surfaces, and
the following conditional expressions (4) and (6) are satisfied:

$$0.26 < 1GUY/fw < 0.35 \quad (4), \text{ and}$$

$$0.60 < 2GUY/fw < 1.00 \quad (6),$$

where 1GUY is the height, from the optical axis, of axial marginal rays incident on a refractive surface located closest to the object side in the first lens unit at the wide angle end, 2GUY is the height, from the optical axis, of axial marginal rays incident on a refractive surface located closest to the object side in the second lens unit at the wide angle end, and fw is a focal length of the entire zoom lens system at the wide angle end.

16. A zoom lens comprising:
a first lens unit having a negative refracting power disposed closest to the object side; and
a second lens unit having a positive refracting power disposed on the image side of the first lens unit, wherein
during zooming from the wide angle end to the telephoto end, a distance between the first lens unit and the second lens unit decreases,
the first cemented lens component and the second cemented lens component are arranged adjacent to each other,
the image side surface of the first cemented lens component and the object side surface of the second cemented lens component are both concave surfaces, and
the second lens unit satisfies the following conditional expression (8):

$$2.5 < f2/fw < 3.5 \quad (8),$$

where f2 is a focal length of the second lens unit, and fw is a focal length of the entire zoom lens system at the wide angle end.

17. A zoom lens comprising:
a first lens unit having a negative refracting power disposed closest to the object side; and
a second lens unit having a positive refracting power disposed on the image side of the first lens unit, wherein
during zooming from the wide angle end to the telephoto end, a distance between the first lens unit and the second lens unit decreases,
when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component,
the first cemented lens component and the second cemented lens component are arranged adjacent to each other,
the image side surface of the first cemented lens component and the object side surface of the second cemented lens component are both concave surfaces, and
further comprising an aperture stop that adjusts the F-number, wherein the first lens unit satisfies the following conditional expression (7):

$$1.4 < |f1|/(fw \cdot Fnow) < 2.0 \quad (7),$$

where f1 is a focal length of the first lens unit, fw is a focal length of the entire zoom lens system at the wide angle end, and Fnow is an F-number at a full aperture at the wide angle end.

18. A zoom lens comprising:
a first lens unit having a negative refracting power disposed closest to the object side; and
a second lens unit having a positive refracting power disposed on the image side of the first lens unit, wherein
during zooming from the wide angle end to the telephoto end, a distance between the first lens unit and the second lens unit decreases, when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component, during zooming from the wide angle end to the telephoto end, a distance between the first lens unit and the second lens unit decreases, when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component, the first cemented lens component and the second cemented lens component are arranged adjacent to each other, the image side surface of the first cemented lens component and the object side surface of the second cemented lens component are both concave surfaces, and the following conditional expressions (4) and (5) are satisfied:

$$0.26 < 1GUY/fw < 0.35 \qquad (4), \text{ and}$$

$$0.2 < 2GUY/f2 < 0.5 \qquad (5),$$

where 1GUY is the height, from the optical axis, of axial marginal rays incident on a refractive surface located closest to the object side in the first lens unit at the wide angle end, 2GUY is the height, from the optical axis, of axial marginal rays incident on a refractive surface located closest to the object side in the second lens unit at the wide angle end, fw is a focal length of the entire zoom lens system at the wide angle end, and f2 is a focal length of the second lens unit.

19. A zoom lens comprising:
a first lens unit having a negative refracting power disposed closest to the object side; and
a second lens unit having a positive refracting power disposed on the image side of the first lens unit, wherein
during zooming from the wide angle end to the telephoto end, a distance between the first lens unit and the second lens unit decreases,
when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component,
the first cemented lens component and the second cemented lens component are arranged adjacent to each other, the image side surface of the first cemented lens component and the object side surface of the second cemented lens component are both concave surfaces, and further comprising a third lens unit provided on the image side of the second lens unit, wherein the third lens unit satisfies the following conditional expression (9):

$$3.5 < f3/fw < 6.5 \qquad (9),$$

where f3 is a focal length of the third lens unit, and fw is a focal length of the entire zoom lens system at the wide angle end.

20. A zoom lens comprising:
a first lens unit having a negative refracting power disposed closest to the object side; and
a second lens unit having a positive refracting power disposed on the image side of the first lens unit, wherein
during zooming from the wide angle end to the telephoto end, a distance between the first lens unit and the second lens unit decreases,
when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component,
the first cemented lens component and the second cemented lens component are arranged adjacent to each other,
the image side surface of the first cemented lens component and the object side surface of the second cemented lens component are both concave surfaces, and
the following conditional expression (10) is satisfied:

$$10 < Lw/fw < 12 \qquad (10),$$

where Lw is an entire length of the zoom lens at the wide angle end with a back focus being represented by an equivalent air distance, fw is a focal length of the entire zoom lens system at the wide angle end.

21. A zoom lens comprising:
a first lens unit having a negative refracting power disposed closest to the object side; and
a second lens unit having a positive refracting power disposed on the image side of the first lens unit, wherein
during zooming from the wide angle end to the telephoto end, a distance between the first lens unit and the second lens unit decreases,
when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component,
the first cemented lens component and the second cemented lens component are arranged adjacent to each other, the image side surface of the first cemented lens component and the object side surface of the second cemented lens component are both concave surfaces, and the following conditional expression (11) is satisfied:

$$3.5 < M2G/fw < 5.0 \qquad (11),$$

where M2G is an amount of movement of the second lens unit during zooming from the wide angle end to the telephoto end with a movement toward the object side being represented by a positive value, and fw is a focal length of the entire zoom lens system at the wide angle end.

22. A zoom lens comprising:
a first lens unit having a negative refracting power disposed closest to the object side; and
a second lens unit having a positive refracting power disposed on the image side of the first lens unit, wherein
during zooming from the wide angle end to the telephoto end, a distance between the first lens unit and the second lens unit decreases,
when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component,
the first cemented lens component and the second cemented lens component are arranged adjacent to each other,
the image side surface of the first cemented lens component and the object side surface of the second cemented lens component are both concave surfaces, and
further comprising a third lens unit having an aspheric surface and disposed on the image side of the second lens unit, wherein a distance between the second lens unit and the third lens unit changes during zooming from the wide angle end to the telephoto end.

23. A zoom lens comprising:
a first lens unit having a negative refracting power disposed closest to the object side; and
a second lens unit having a positive refracting power disposed on the image side of the first lens unit, wherein
during zooming from the wide angle end to the telephoto end, a distance between the first lens unit and the second lens unit decreases,
when a lens component is defined as a lens member whose refractive surfaces that are in contact with air in an optical path include only two surfaces or an object side surface and an image side surface, the second lens unit comprises a first cemented lens component made up of a plurality of lens elements having different refractive indices and different Abbe constants, and a second cemented lens component made up of a plurality of lens elements having different refractive indices and different Abbe constants disposed on the image side of the first cemented lens component,
the first cemented lens component and the second cemented lens component are arranged adjacent to each other,
the image side surface of the first cemented lens component and the object side surface of the second cemented lens component are both concave surfaces, and
during zooming from the wide angle end to the telephoto end, the first lens unit moves first toward the image side and thereafter toward the object side, and the second lens unit moves only toward the object side.

* * * * *